(12) United States Patent
Ohtsuka et al.

(10) Patent No.: US 10,197,739 B2
(45) Date of Patent: Feb. 5, 2019

(54) OPTICAL CONNECTOR PLUG, RECEPTACLE FOR OPTICAL CONNECTOR, AND OPTICAL CONNECTOR CONNECTION STRUCTURE

(71) Applicant: SEI OPTIFRONTIER CO., LTD., Yokohama-shi, Kanagawa (JP)

(72) Inventors: Kenichiro Ohtsuka, Chigasaki (JP); Yuji Suzuki, Chigasaki (JP); Norihiko Kitahara, Chigasaki (JP); Motoyoshi Kimura, Komaki (JP); Masanori Yamanaka, Komaki (JP); Akihiko Miyada, Komaki (JP); Seiya Otokita, Komaki (JP); Tatsuhiko Shitomi, Komaki (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/552,075

(22) PCT Filed: Feb. 18, 2016

(86) PCT No.: PCT/JP2016/054741
§ 371 (c)(1),
(2) Date: Aug. 18, 2017

(87) PCT Pub. No.: WO2016/136592
PCT Pub. Date: Sep. 1, 2016

(65) Prior Publication Data
US 2018/0031773 A1 Feb. 1, 2018

(30) Foreign Application Priority Data

Feb. 23, 2015 (JP) .................................. 2015-032875
Sep. 25, 2015 (JP) .................................. 2015-188115
Nov. 6, 2015 (JP) .................................. 2015-218264

(51) Int. Cl.
*G02B 6/38* (2006.01)
*G02B 6/255* (2006.01)
(Continued)

(52) U.S. Cl.
CPC ............. *G02B 6/38* (2013.01); *G02B 6/2552* (2013.01); *G02B 6/387* (2013.01); *G02B 6/3879* (2013.01);
(Continued)

(58) Field of Classification Search
CPC .... G02B 6/3816; G02B 6/3891; G02B 6/387; G02B 6/3873
See application file for complete search history.

(56) References Cited

U.S. PATENT DOCUMENTS 6,283,640 B1 * 9/2001 Stephenson ............ G02B 6/381
385/55
2002/0114583 A1 8/2002 Asada et al.

FOREIGN PATENT DOCUMENTS

CN   A-1561462    1/2005
CN   103576248    2/2014
(Continued)

*Primary Examiner* — Omar R Rojas
(74) *Attorney, Agent, or Firm* — Drinker Biddle & Reath LLP

(57) ABSTRACT

An optical connector plug includes an optical connector having an optical fiber built therein, and a cover member receiving the optical connector therein. The cover member includes a set of protrusions provided to protrude forward relative to a front end surface of the optical connector. A set of cutout portions as space portions are provided between the set of protrusions, and the set of cutout portions are arranged at locations opposing each other around the optical connector.

12 Claims, 25 Drawing Sheets

(51) Int. Cl.
*G02B 6/42* (2006.01)
*H01R 13/502* (2006.01)
(52) U.S. Cl.
CPC ......... *G02B 6/3891* (2013.01); *G02B 6/3893* (2013.01); *G02B 6/3897* (2013.01); *G02B 6/4292* (2013.01); *G02B 6/3878* (2013.01); *G02B 6/3887* (2013.01); *H01R 13/502* (2013.01)

(56) References Cited

FOREIGN PATENT DOCUMENTS

| | | |
|---|---|---|
| JP | 2002-107570 A | 4/2002 |
| JP | 4577793 B2 | 11/2010 |
| JP | 2013-540410 A | 10/2013 |
| JP | 2014-26134 A | 2/2014 |
| JP | D1490817 S | 2/2014 |
| WO | WO-03-050579 A2 | 6/2003 |
| WO | WO-2012/038104 A1 | 3/2012 |

\* cited by examiner

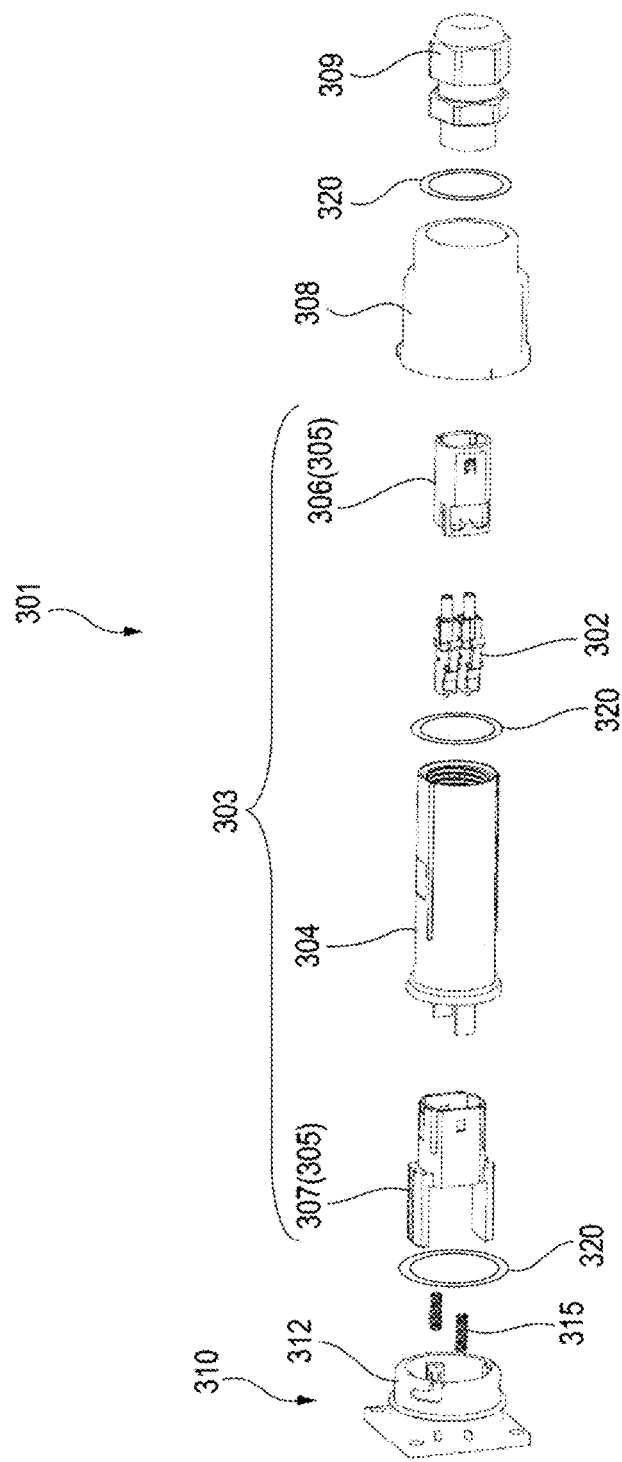

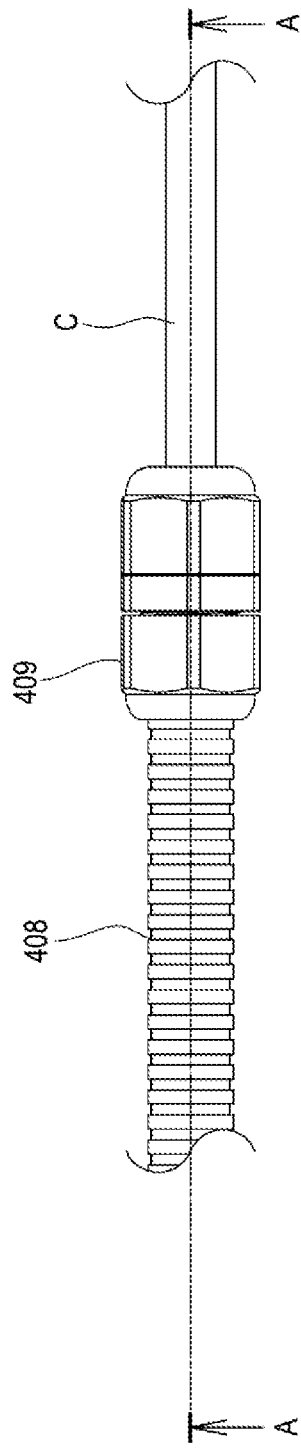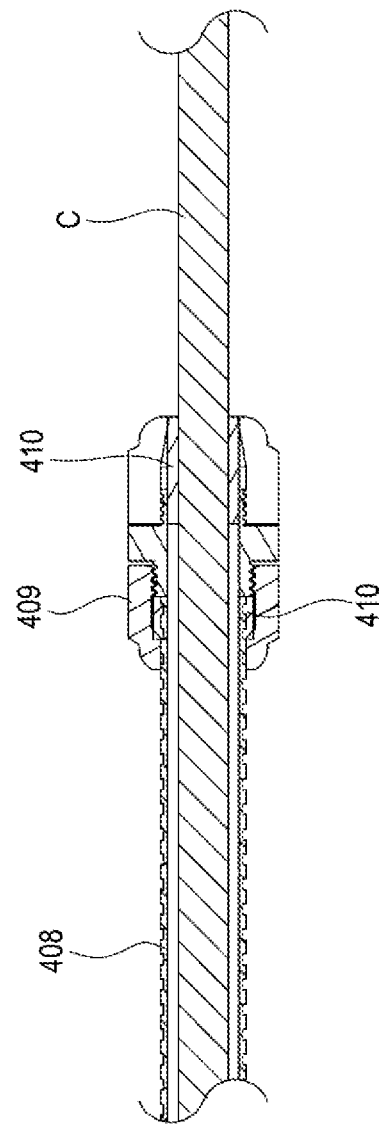
FIG. 27A
FIG. 27B

FIG. 28
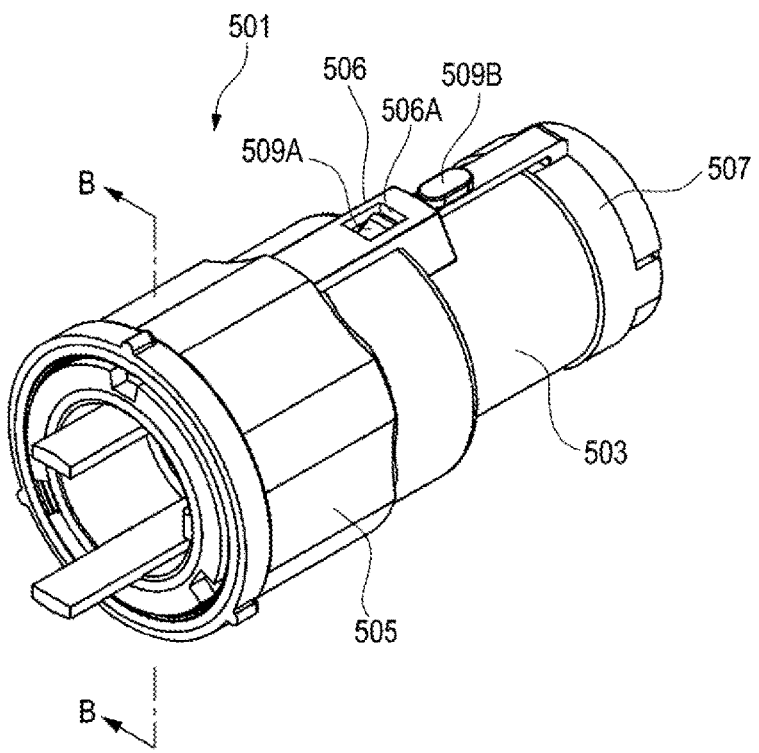
FIG. 29A
FIG. 29B
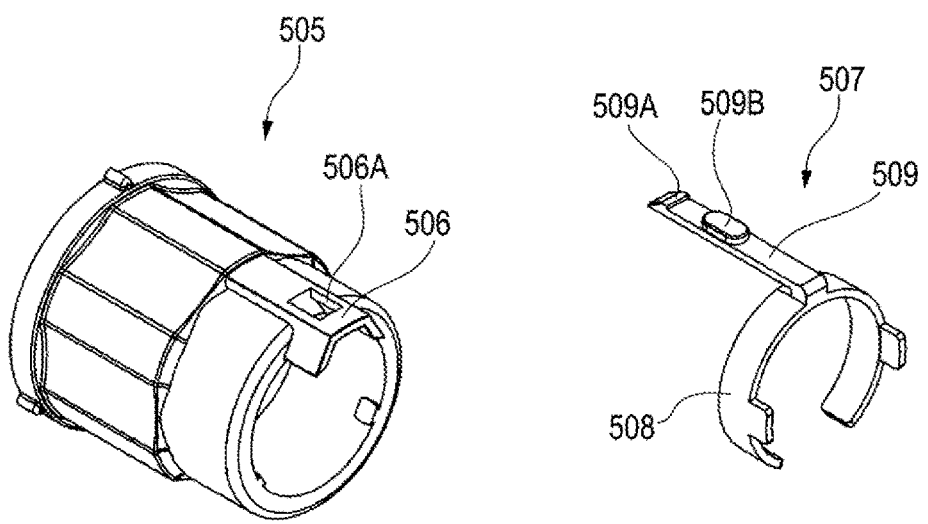

OPTICAL CONNECTOR PLUG, RECEPTACLE FOR OPTICAL CONNECTOR, AND OPTICAL CONNECTOR CONNECTION STRUCTURE

TECHNICAL FIELD

The present invention relates to an optical connector plug having an optical connector built therein to be attached to an end of an optical fiber cord, to an optical connector receptacle to be connected with the optical connector plug, and to an optical connector connection structure.

BACKGROUND ART

In Patent Document 1, a waterproof connector is disclosed, which includes a connector member for supporting a ferrule, a coupling member configured to protrude along an abutting direction of the ferrule and to be coupled with a corresponding connector, and a body portion for supporting the connector member and the coupling member.

Also, in Patent Document 2, an optical connector housing having a cylindrical protrusion protruding relative to a front end surface of an optical connector built therein is disclosed.

CITATION LIST

Patent Document

Patent Document 1: Japanese Patent No. 4577793
Patent Document 2: Japanese Design Registration No. 1490817

SUMMARY OF INVENTION

Technical Problem

In the waterproof connector described in Patent Document 1, an end surface of the connector member protrudes relative to an end surface of the body portion supporting the connector member. Thus, contamination or scratches are likely to be occurred on the end surface of the connector member.

Also, in the optical connector housing shown in Patent Document 2, an end surface of the optical connector is retracted inward relative to an end surface of the cylindrical protrusion provided around the optical connector. Thus, observation or cleaning of the end surface of the optical connector is difficult.

An object of the present invention is to provide an optical connector plug, in which a front end surface of an optical connector can be protected, states of the front end surface and side surfaces of the optical connector can be easily observed, and an operation of cleaning the end surface of the optical connector can be also easily performed. Also, additional objects of the present invention are to provide an optical connector receptacle to be connected with the optical connector plug and to provide an optical connector connection structure, in which the optical connector plug is connected with the optical connector receptacle.

Solution to Problem

In order to achieve the object, an optical connector plug of the present invention includes:

an optical connector having an optical fiber built therein; and a cover member receiving the optical connector therein;

wherein the cover member includes a set of protrusions provided to protrude forward relative to a front end surface of the optical connector;

wherein a set of cutout portions as space portions are provided between the set of protrusions;

wherein the set of cutout portions are arranged at locations opposing each other around the optical connector.

In order to achieve the object, an optical connector receptacle of the present invention includes:

an adapter capable of being connected to the optical connector built in the optical connector plug as described above, and a receiving portion which receives the adapter therein, wherein an elastic member is provided on an inner surface of the receiving portion, wherein the elastic member is configured to urge the cover member toward a direction opposite to the adapter in a state where the optical connector is coupled with the adapter.

In order to achieve the object, an optical connector connection structure of the present invention includes:

the optical connector plug as described above and the optical connector receptacle as described above capable of being coupled with each other.

Advantageous Effects of Invention

According to the present invention, an optical connector plug, an optical connector receptacle to be connected with the optical connector plug and an optical connector connection structure can be provided, in which a front end surface of an optical connector can be protected, states of the front end surface and side surfaces of the optical connector can be easily observed, and an operation of cleaning the end surface of the optical connector can be also easily performed.

BRIEF DESCRIPTION OF DRAWINGS

FIG. 17 is an exploded view of the optical connector plug and the optical connector receptacle shown in FIG. 16.

FIG. 27A is a side view showing a protective pipe and a cable gland of the optical connector plug shown in FIG. 25 and FIG. 27B is a sectional view take along a line A-A in FIG. 27A.

FIG. 28 is a perspective view of an optical connector plug according to a sixth embodiment.

FIG. 29A is a perspective view of a coupling member of the optical connector plug shown in FIG. 28 and FIG. 29B is a perspective view of an engagement member configured to be attached to a cover member of the optical connector plug shown in FIG. 28.

DESCRIPTION OF EMBODIMENTS

Figure 1:
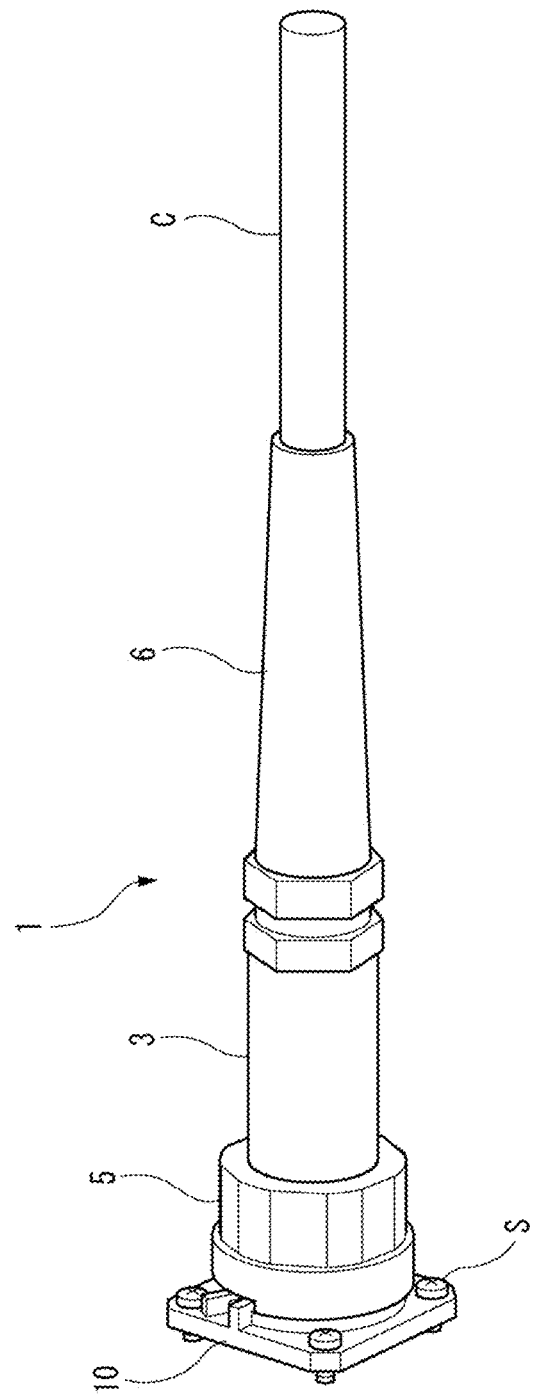
FIG. 1 is a perspective view showing a state where an optical connector plug is attached to an optical connector receptacle according to the present invention.

Summary of Exemplary Embodiments of the Present Invention

First, Exemplary embodiments of the present invention will be described.

An optical connector plug according to embodiments of the present invention includes:

(1) an optical connector having an optical fiber built therein; and a cover member receiving the optical connector therein;

wherein the cover member includes a set of protrusions provided to protrude forward relative to a front end surface of the optical connector;

wherein a set of cutout portions as space portions are provided between the set of protrusions;

wherein the set of cutout portions are arranged at locations opposing each other around the optical connector.

According to this configuration, the front end surface of the optical connector can be simply protected by the protrusions of the cover member. Also, since the protrusions do not cover the entire circumference of the optical connector in a circumferential direction thereof, it is possible to easily observe states of the front end surface and side surfaces of the optical connector through the set of cutout portions. Also, since the set of cutout portions are provided, it is possible to easily perform an operation of cleaning the front end surface of the optical connector.

(2) The cover member includes an outer housing and an attachment member which attaches the optical connector to the outer housing, wherein the attachment member integrally has the set of protrusions and is configured to be insertable into the outer housing and to have a structure corresponding to a shape of the optical connector.

According to this configuration, it is possible to enhance work efficiency upon assembly of the optical connector plug.

(3) In a state where the attachment member is inserted in the outer housing, the attachment member can be moved along a longitudinal direction of the outer housing.

According to this configuration, it is possible to absorb a shape difference or dimensional error of the receptacle, which is a connection destination of the set of protrusions provided on the attachment member, thereby achieving a proper connection between the optical connector plug and the receptacle.

(4) When the optical connector is coupled with an adapter received in an optical connector receptacle, the outer housing is urged along the longitudinal direction toward a direction opposite to the optical connector receptacle.

According to this configuration, it is possible to properly release a pressing force exerted on the optical connector when the optical connector plug is fitted into the optical connector receptacle.

(5) A projection protruding toward the optical connector receptacle is provided on a front surface portion of the outer housing, wherein when the optical connector is coupled with the adapter, the projection is abutted against an elastic member provided on an inner surface of the optical connector receptacle.

According to this configuration, it is possible to easily release a pressing force exerted on the optical connector when the optical connector plug is fitted into the optical connector receptacle.

(6) The projection is arranged at a location corresponding to one or both of the set of cutout portions.

According to this configuration, it possible to provide at least one projection at a location, where it does not interfere with the set of protrusions.

(7) The outer hosing and the attachment member include concave and convex structures to be engaged with each other, and the attachment member can be moved along the longitudinal direction due to the concave and convex structures.

According to this configuration, it is possible to easily slide the attachment member relative to the outer housing.

(8) An attachment member which attaches the optical connector to the cover member is further provided, and the attachment member is configured to be insertable into the cover member and also up to the vicinity of the middle portion of the cover member in a longitudinal direction thereof, wherein the attachment member has a structure corresponding to a shape of the optical connector.

According to this configuration, attachment members having different shapes depending on shapes of various optical connectors which are generally available can be employed and thus the other components of the optical connector plug can be used in common.

(9) The attachment member is engaged with the protrusions and thus can be fixed to the cover member.

According to this configuration, even after the optical connector is attached to the cover member, the attachment member fixed to the protrusions can be easily separated therefrom.

(10) The cover member integrally has the set of protrusions.

According to this configuration, it is possible to easily connect optical connectors of different shapes to the receptacle via the cover member.

(11) Groove portions are formed on outer surfaces of the set of protrusions along a longitudinal direction of the cover member, and the groove portions can be engaged with convex portions formed on an inner surface of an optical connector receptacle.

According to this configuration, it is possible to engage the set of protrusions with the optical connector receptacle at proper locations.

(12) A flexible protective pipe is further provided to be coupled to a rear end of the cover member at one end thereof and to have a cable gland at the other end thereof.

According to this configuration, since the flexible protective pipe is provided, an optical fiber connected to the optical connector in the optical connector plug can be properly protected, and also even if an optical fiber cable led out of a rear end of the cable gland is bent, the protective pipe can be bent to follow bending of the cable, thereby reducing a strain to be applied to the optical connector.

(13) A coupling member capable of being coupled with an optical connector receptacle is further provided and the cover member is inserted through the coupling member, wherein an engagement portion configured to be engaged with the coupling member so as to be easily detachably attached to the coupling member is provided on an outer circumference of the cover member.

According to this configuration, rotating or sliding of the coupling member can be locked. Thus, it is possible to prevent the coupling member from being erroneously fitted into the optical connector receptacle in a state where the optical connector is not properly connected to the adapter.

An optical connector receptacle according to embodiments of the present invention includes:

(14) an adapter capable of being connected to the optical connector built in the optical connector plug as described above, and a receiving portion which receives the adapter therein, wherein an elastic member is provided on an inner surface of the receiving portion, wherein the elastic member is configured to urge the cover member toward a direction opposite to the adapter in a state where the optical connector is coupled with the adapter.

According to this configuration, it is possible to properly release a pressing force exerted on the optical connector when the optical connector plug is fitted into the optical connector receptacle.

(15) The elastic member is partially exposed from the inner surface.

According to this configuration, it is possible to facilitate attachment of the elastic member to the optical connector receptacle.

(16) Convex portions capable of being engaged with the set of protrusions of the optical connector plug are provided on the inner surface of the receiving portion.

According to this configuration, it is possible to engage the optical connector receptacle with the set of protrusions with at a proper location.

An optical connector connection structure according to embodiments of the present invention includes:

(17) the optical connector plug as described above and the optical connector receptacle as described above capable of being coupled with each other.

According to this configuration, it is possible to provide an optical connector connection structure, which can properly release a pressing force exerted on the optical connector when the optical connector plug is fitted into the optical connector receptacle.

Details of Exemplary Embodiments of the Invention

Now, preferable embodiments of the present invention will be described in detail with reference to the accompanying drawings. Meanwhile, in the description of the drawings, the same or similar components are designated by the same reference numerals, and the repeated description thereof will be omitted.

First Embodiment

Figure 2:
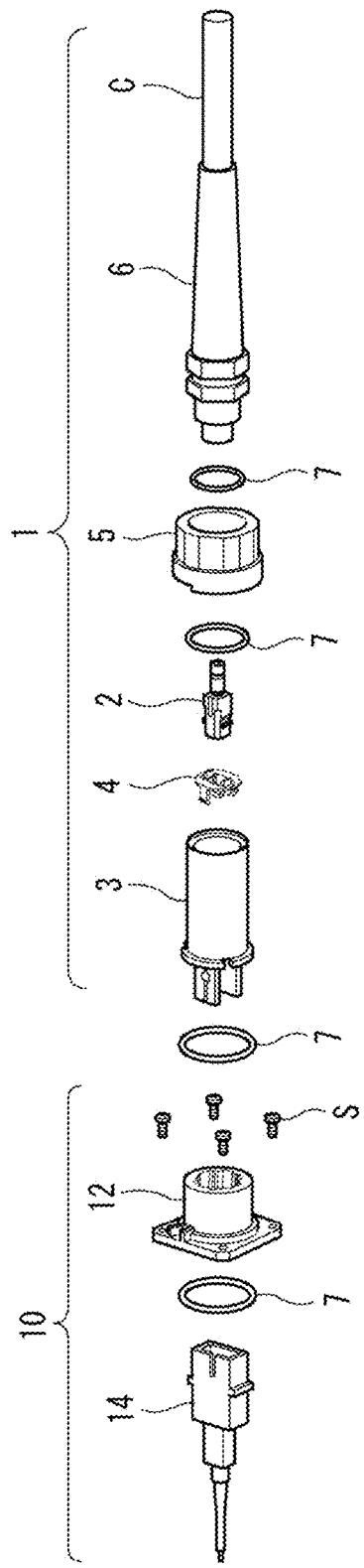
FIG. 2 is an exploded view of the optical connector plug and the optical connector receptacle of FIG. 1.

FIG. 1 is a perspective view showing a state where an optical connector plug is attached to an optical connector receptacle according to the first embodiment. FIG. 2 is an exploded view of the optical connector plug and the optical connector receptacle of FIG. 1. Hereinafter, a side of the optical connector plug, which faces the optical connector receptacle (left side in FIG. 1) is referred to as a front side of the optical connector plug and a side opposite thereto (right side in FIG. 1) is referred to as a rear side of the optical connector plug.

As shown in FIGS. 1 and 2, the optical connector plug 1 is configured to be freely detachably attached to the optical connector receptacle 10 (hereinafter, simply referred to as a receptacle).

The optical connector plug 1 includes an optical connector 2 and a cover member 3 receiving the optical connector 2 therein. Additionally, the optical connector plug 1 includes an attachment member 4, a coupling member 5 and a boot 6. The coupling member 5 is a member for coupling the optical connector plug 1 with the receptacle 10 and is provided to be slidable around the cover member 3. The boot 6 is connected to a rear end of the cover member 3 and covers an optical fiber cord C as described below. Therefore, the optical fiber cord C is protected to prevent the optical fiber cord C from being sharply bent. In addition, O-rings 7 are arranged between respective members, thereby ensuring a waterproofing property when the optical connector plug 1 has been assembled and also when the optical connector plug 1 has been attached to the receptacle 10.

Figure 3:
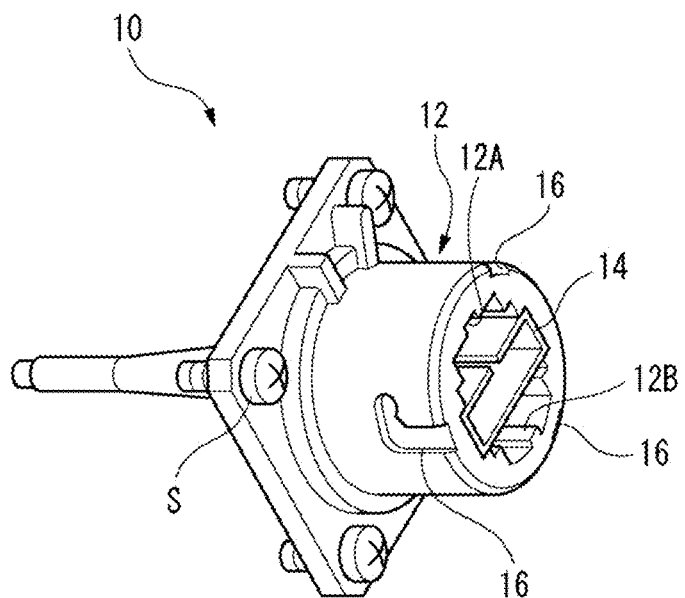
FIG. 3 is a perspective view of the optical connector receptacle.

FIG. 3 is a perspective view of the receptacle 10.

As shown in FIG. 3, the receptacle 10 is used while being fixed, for example, to a wall surface (not shown) by screws S extending through screw holes thereof. The receptacle 10 has a cylindrical portion 12 protruding toward the optical connector plug 1. The cylindrical portion 12 is provided therein with an adapter 14 capable of being connected with the optical connector 2. On an inner circumferential surface of the cylindrical portion 12, a concave portion 12A and a convex portion 12B are provided to receive protrusions of the cover member 3 as described below. Fixing grooves 16 having a generally L-shape are provided on a rear end side of an outer circumferential surface of the cylindrical portion 12. In this example, the fixing grooves 16 are arranged, for example, at three locations along the outer circumference of the cylindrical portion 12. Meanwhile, projections (not shown) corresponding to the respective fixing grooves 16 of the receptacle 10 are provided inside the coupling member 5 of the optical connector plug 1. When the optical connector plug 1 is fixed to the receptacle 10, the projections of the coupling member 5 are pushed into and along the fixing grooves 16 of the cylindrical portion 12. Therefore, the optical connector plug 1 is connected to the receptacle 10 in a so-called bayonet lock manner.

Figure 4:
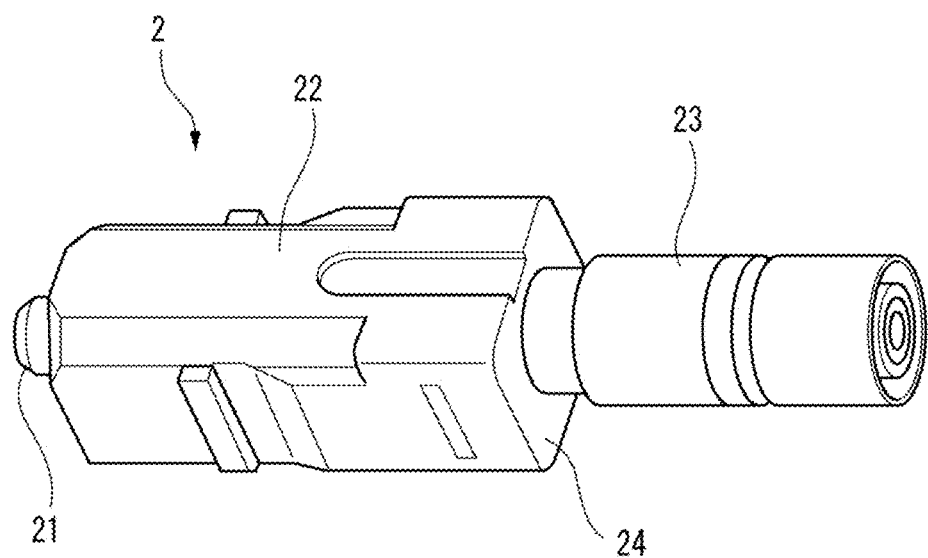
FIG. 4 is a perspective view of an optical connector provided in the optical connector plug of FIG. 1.

FIG. 4 is a perspective view of the optical connector 2.

As shown in FIG. 4, the optical connector 2 includes a ferrule 21, a connector housing 22 for holding the ferrule 21, and a rear housing 23 connected to a rear end side of the connector housing 22. The optical connector 2 is a SC connector on which an optical fiber cord C incorporated in an optical cable is mounted. The optical fiber cord C has an optical fiber (not shown), a tensile strength fiber covering the optical fiber, and a sheath covering the tensile strength fiber. The optical fiber has an ultraviolet curable resin (UV resin) covered around a glass optical fiber, which includes a core and a cladding and has, for example, a diameter of 125 μm, in such a manner that an outer diameter thereof becomes, for example, 250 μm. Depending on uses, nylon resin or the like is additionally covered therearound, thereby obtaining a diameter of 900 μm. As resin forming the sheath, flame-retardant polyethylene is particularly preferably used. The optical connector 2 can be mounted on the adapter 14 built in the receptacle 10.

The ferrule 21 has a front end surface arranged to protrude from a front end surface of the connector housing 22. The ferrule 21 is provided, on the middle portion thereof in a circumferential direction, with an insertion hole (not shown) along a longitudinal direction of the ferrule 21. A glass fiber, which is further exposed from the optical fiber drawn out of the optical fiber cord C, is inserted in the insertion hole.

The connector housing 22 is a hollow member and is configured to hold the ferrule 21 therein. A side of the connector housing 22 opposite to a side from which the ferrule 21 protrudes is referred to as a rear end 24 thereof. Also, the rear housing 23 is connected to the connector housing 22 to protrude rearward from the rear end side of the connector housing 22. The optical fiber cord C is introduced into the rear housing 23 from a rear end side thereof.

Figure 5A:
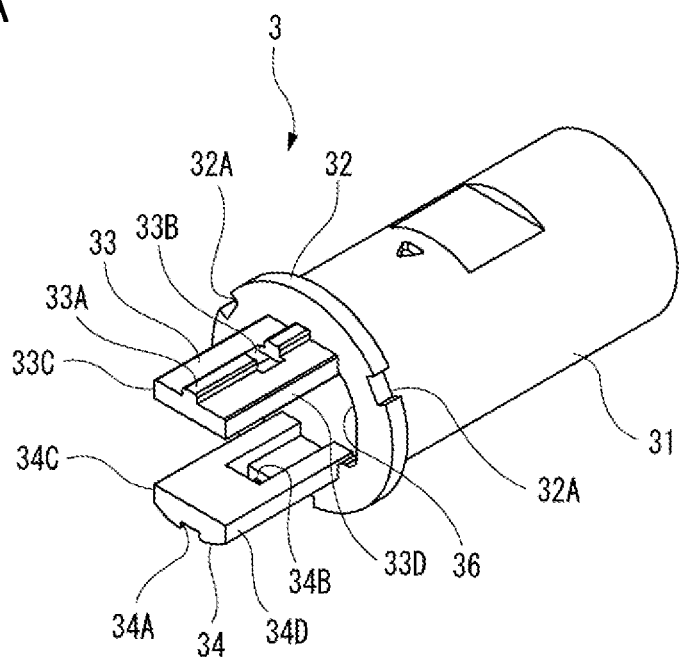
FIG. 5A is a front perspective view of a cover member for covering the optical connector of FIG. 4
Figure 5B:
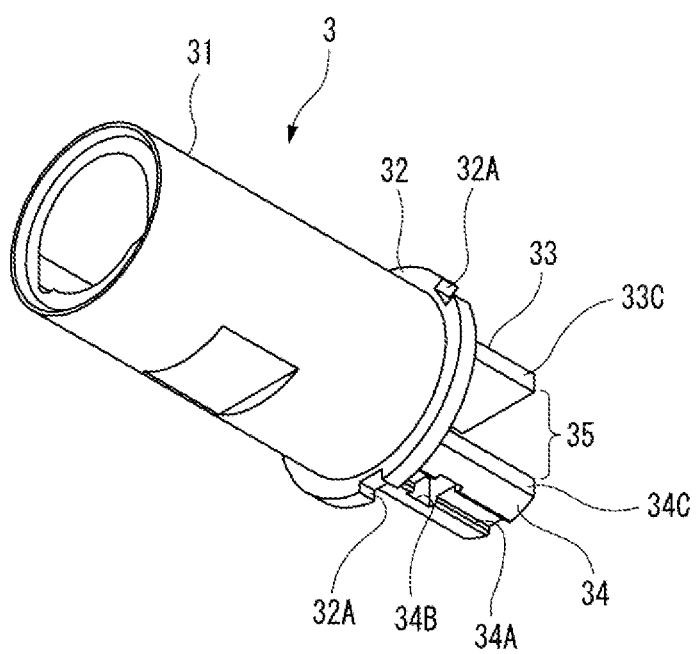
FIG. 5B is a rear perspective view of the cover member.

FIG. 5A is a front perspective view of the cover member 3 for covering the optical connector 2 and FIG. 5B is a rear perspective view of the cover member 3.

As shown in FIGS. 5A and 5B, the cover member 3 is a member made of resin and has a receiving portion 31, a flange portion 32, and a set of protrusions 33, 34. The receiving portion 31 has a generally cylindrical shape and is configured to receive a rear end side of the optical connector 2 therein. The flange portion 32 is provided to have a diameter expanded relative to an outer circumference of the receiving portion 31 at a front end surface of the receiving portion 31. Groove portions 32A are provided, for example, at three locations on an outer circumference of the flange portion 32. On the other hand, on the inside of the coupling member 5, projections (not shown) are provided at locations corresponding to the respective groove portions 32A of the flange portion 32. The projections of the coupling member 5 pass through the groove portions 32A of the flange portion 32, thereby providing a structure, in which the coupling member 5 covered around the cover member 3 can be slid relative to the cover member 3.

The set of protrusions 33, 34 are integrally formed with the receiving portion 31 and the flange portion 32. The set of protrusions 33, 34 are arranged to protrude forward from the receiving portion 31 via the flange portion 32. The upper protrusion 33 of the set of protrusions 33, 34, which is arranged on the upper side of FIG. 5A, is a quadrangular column having a rectangular shape in a cross section perpendicular to a longitudinal direction thereof. On an upper surface portion of the upper protrusion 33, a convex portion 33A is provided along a longitudinal middle portion thereof. The convex portion 33A is formed to have a shape matched with that of the concave portion 12A provided in the cylindrical portion 12 of the receptacle 10. Also, the protrusion 33 is provided with an opening portion 33B configured to divide the convex portion 33A in the longitudinal direction.

Figure 8A:
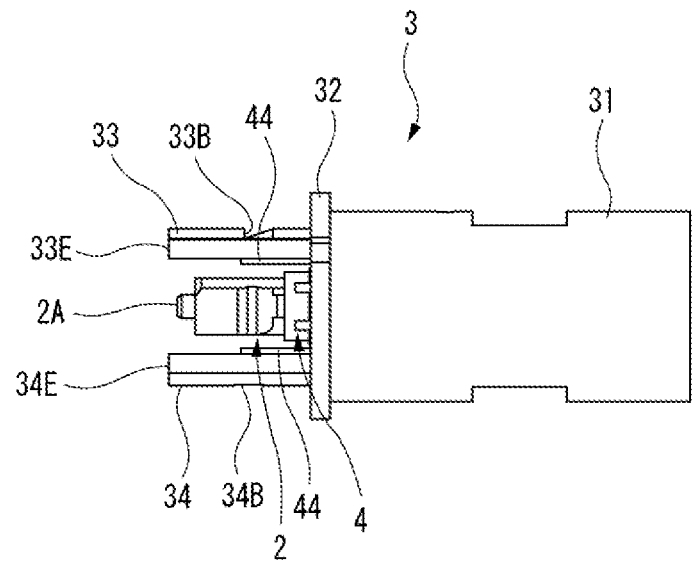
FIG. 8A is a side view showing the attached state of FIG. 7
Figure 8B:
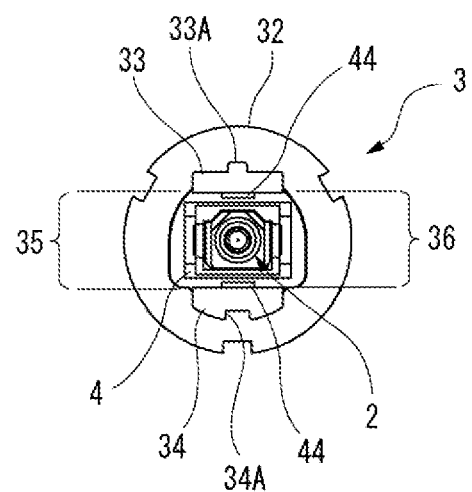
FIG. 8B is a front view showing the attached state of FIG. 7.

The lower protrusion 34, which is arranged on the lower side of FIG. 5A, is provided to oppose and be generally parallel to the upper protrusion 33, as shown in FIGS. 5A and 5B and 8B. On a lower surface portion of the lower protrusion 34, a concave portion 34A is provided along a longitudinal middle portion thereof. The concave portion 34A is formed to have a shape matched with that of the convex portion 12B provided in the cylindrical portion 12 of the receptacle 10. Also, the lower protrusion 34 is provided with an opening portion 34B configured to divide the concave portion 34A in the longitudinal direction.

Space portions for receiving a front end portion of the optical connector 2, which protrudes from the receiving portion 31, are provided between the upper protrusion 33 and the lower protrusion 34. In the present embodiment, a space portion between one side surface 33C of the upper protrusion 33 and one side surface 34C of the lower protrusion 34 is referred to as a cutout portion 35, and a space portion between the other side surface 33D of the upper protrusion 33 and the other side surface 34D of the lower protrusion 34 is referred to as a cutout portion 36. A set of cutout portions 35, 36 are respectively provided at locations opposing each other around the optical connector 2 in a state where the optical connector 2 is attached to the cover member 3. That is, the optical connector 2, the cutout portion 35 and the cutout portion 36 are arranged on a straight line in a common plane in a direction perpendicular to the longitudinal direction of the optical connector 2.

Figure 6A:
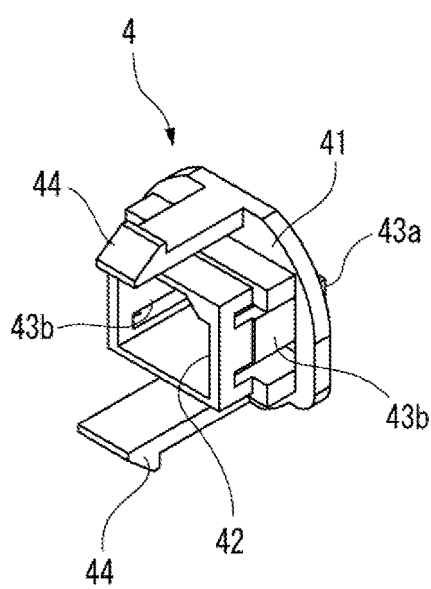
FIG. 6A is a front perspective view of an attachment member for attaching the optical connector to the cover member and FIG. 6B is a rear perspective view of the attachment member.
Figure 6B:
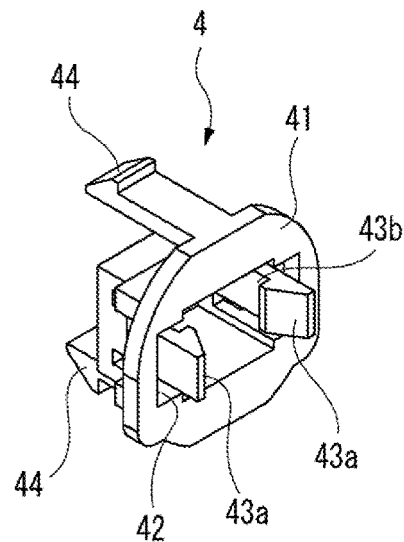

FIG. 6A is a front perspective view of the attachment member 4 and FIG. 6B is a rear perspective view of the attachment member 4.

The attachment member 4 is a member for attaching the optical connector 2 to the cover member 3. The attachment member 4 is a member capable of being inserted into the cover member 3 and also up to the vicinity of the middle portion of the cover member 3 in a longitudinal direction thereof. As shown in FIGS. 6A and 6B, the attachment member 4 is a member made of resin and has a frame 41. The frame 41 has an opening portion 42 configured to allow the optical connector 2 to be inserted therethrough. A pair of first engaging claws 43a are provided to protrude from opposing sides of a rectangular cross-sectioned inner circumferential surface of the frame 41, which defines the opening portion 42, toward the rear of the optical connector plug 1. The rear end 24 of the connector housing 22 of the optical connector 2 is engaged with the pair of first engaging claws 43a are engaged with and also is sandwiched between base portions 43b of the pair of first engaging claws, thereby fixing the optical connector 2. A pair of second engaging claws 44 are provided to protrude from sides of an outer circumferential surface of the frame 41, which are perpendicular to the sides on which the pair of first engaging claws 43a and the base portions 43b are provided, toward the front of the optical connector plug 1. The pair of second engaging claws 44 are engaged with the opening portions 33B, 34B of the protrusions 33, 34 of the cover member 3. Therefore, the optical connector 2 fixed to the attachment member 4 can be attached to the cover member 3.

In addition, the attachment member 4 according to the present embodiment can be configured to have a structure corresponding to the shape of the optical connector 2. Instead of the SC type optical connector as described as an example in the present embodiment, for example, a LC type optical connector or MPO type optical connector may be employed as the optical connector 2. The shape of the attachment member 4 may be appropriately changed to be suitable for shapes of such optical connectors while maintaining the shape of the pair of second engaging claws 44 to be engaged with the cover member 3.

Figure 7:
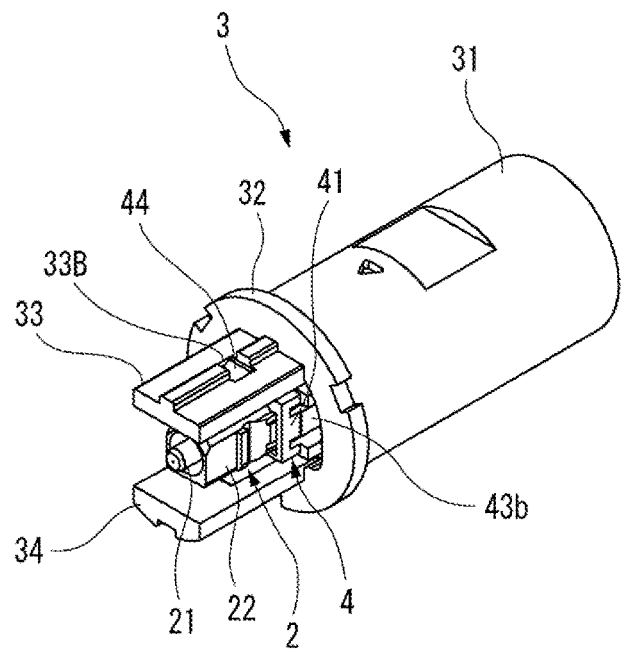
FIG. 7 is a perspective view showing a state where the optical connector is attached to the cover member via the attachment member.

FIGS. 7, 8A and 8B shows a state where the optical connector 2 is attached to the cover member 3 via the attachment member 4.

As shown in FIG. 7, as the attachment member 4 with the optical connector 2 fixed thereto is attached to the cover member 3, the optical connector 2 is fixed to the cover member 3 in a state where a front portion thereof protrudes from the receiving portion 31 of the cover member 3.

In the state where the optical connector 2 is fixed to the cover member 3 in such a way, as shown in FIG. 8A, front end surfaces 33E, 34E of the protrusions 33, 34 of the cover member 3 protrude forward relative to a front end surface 2A of the optical connector 2. Also, as shown in FIG. 8B, the set of cutout portions 35, 36 provided between the upper protrusion 33 and the lower protrusion 34 are respectively arranged at locations opposing each other around the optical connector 2 received in the cover member 3. That is, in the state where the optical connector 2 is fixed to the cover member 3, opposing side portions of the outer circumferential surface of the optical connector 2 are not covered with the cover member 3.

According to the configuration of the first embodiment described above, the front end surface 2A of the optical connector 2 can be simply protected by the protrusions 33, 34 of the cover member 3 protruding forward relative to the front end surface 2A of the optical connector 2. Also, the protrusions 33, 34 do not cover the entire circumference of the optical connector 2 in a circumferential direction thereof, and the set of cutout portions 35, 36, which are space portions, are provided at locations opposing each other around the optical connector 2. Accordingly, it is possible to easily observe states of the front end surface and side surfaces of the optical connector 2 through the set of cutout portions 35, 36 and also to easily perform an operation of cleaning the front end surface of the optical connector 2 through the set of cutout portions 35, 36.

Further, the optical connector plug 1 of the first embodiment has the attachment member 4 as a member for attaching the optical connector 2 to the cover member 3, which can be inserted into the cover member 3 and also up to the vicinity of the middle portion of the cover member 3 in a longitudinal direction thereof. In addition, the attachment member 4 of the present embodiment can be configured to have a structure corresponding to the shape of the optical connector 2. In a configuration where an optical connector is directly fixed to a cover member, if it is desired to use a LC type optical connector or MPO type optical connector, instead of the SC type optical connector, a structure of the cover member itself has to be changed to be suitable for the respective types of such optical connectors. However, according to the present embodiment, since the optical connector 2 is attached to the cover member 3 via the attachment member 4, the structure of the attachment member 4 can be changed to correspond to various optical connectors, thereby allowing the other components of the optical connector plug 1 (e.g., cover member 3) to be used in common.

Further, in the first embodiment, the attachment member 4 is engaged with the opening portions 33B, 34B provided on the protrusions 33, 34 of the cover member 3, to which an operator can be easily accessed, and thus is fixed to the cover member 3.

Accordingly, even after the optical connector 2 is attached to the cover member 3, the attachment member 4 fixed to the cover member 3 can be easily separated therefrom, by pushing the engaging claws 43 of the attachment member 4, which are engaged with the protrusions 33, 34, inward from the outside of the opening portions 33B, 34B.

Further, in the first embodiment, since the cover member 3 integrally has the set of protrusions 33, 34, it is possible to easily connect optical connectors of different shapes to the receptacle 10 via the cover member 3.

Second Embodiment

Figure 9:
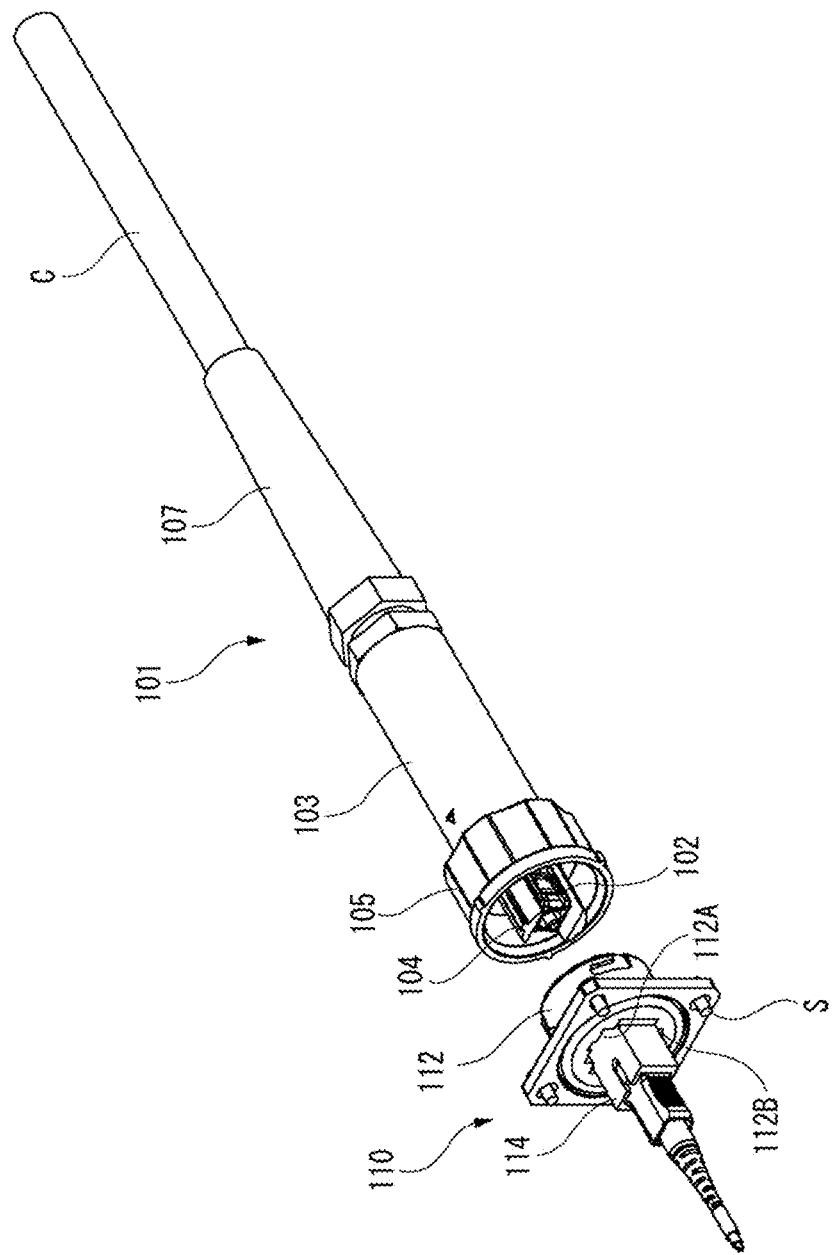
FIG. 9 is a perspective view showing an optical connector plug and an optical connector receptacle configured to allow the optical connector plug to be fitted therein according to a second embodiment.
Figure 10:
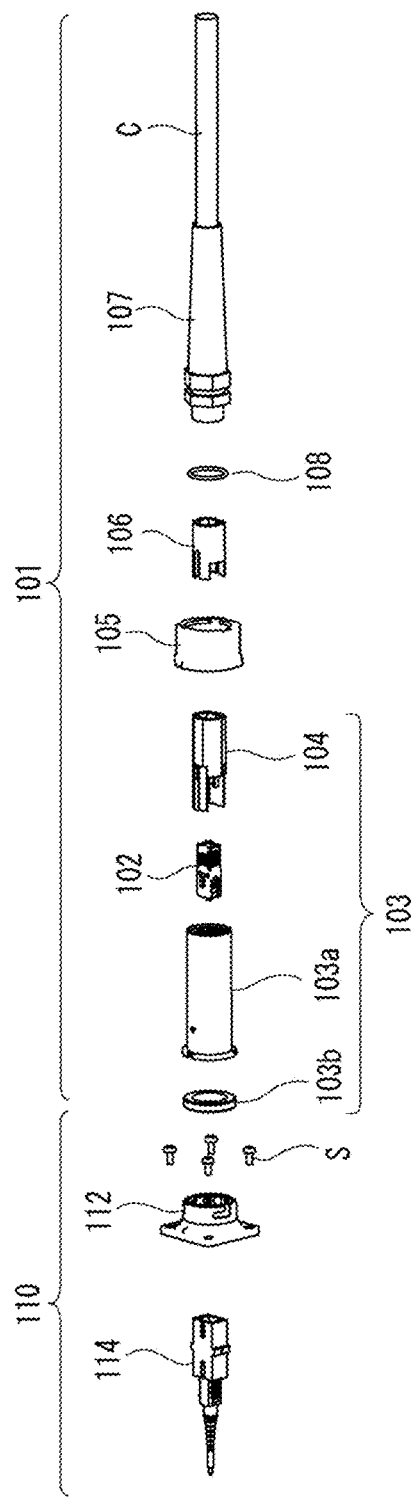
FIG. 10 is an exploded view of the optical connector plug and the optical connector receptacle shown in FIG. 9.

FIG. 9 is a perspective view showing an optical connector plug and an optical connector receptacle configured to allow the optical connector plug to be fitted therein according to the second embodiment. FIG. 10 is an exploded view of the optical connector plug and the optical connector receptacle shown in FIG. 9. Hereinafter, a side of the optical connector plug, which faces the optical connector receptacle (left side in FIG. 10) is referred to as a front side of the optical connector plug and a side opposite thereto (right side in FIG. 10) is referred to as a rear side of the optical connector plug. Meanwhile, the detailed description of members common to the first embodiment will be omitted.

As shown in FIGS. 9 and 10, the optical connector plug 101 is configured to be freely detachably attached to the optical connector receptacle 110 (hereinafter, simply referred to as a receptacle).

The optical connector plug 101 includes an optical connector 102 and a cover member 103 receiving the optical connector 102 therein. The cover member 103 includes an outer housing 103a, a watertight member 103b and an attachment member 104. The outer housing 103a is a cylindrical member, and the optical connector 102 together with the attachment member 104 is received therein. Also, the watertight member 103b is a member ensuring a waterproofing property when the optical connector plug 101 has been attached to the receptacle 110.

The optical connector plug 101 additionally includes a coupling member 105, a pressing member 106, and a boot 107. The coupling member 105 is a member for coupling the optical connector plug 101 with the receptacle 110 and is provided to be slidable around the outer housing 103a of the cover member 103. The boot 107 is connected to a rear end of the outer housing 103a and covers an optical fiber cord C as described below. In addition, an O-ring 108 is arranged between the cover member 103 and the boot 107, thereby ensuring a waterproofing property when the optical connector plug 101 has been assembled.

The receptacle 110 is used while being fixed, for example, to a wall surface (not shown) by screws S extending through screw holes thereof. The receptacle 110 has a cylindrical portion 112 protruding toward the optical connector plug 101. The cylindrical portion 112 is provided therein with an adapter 114 capable of being connected with the optical connector 102. The cylindrical portion 112 includes opening portions 112A, 112B for receiving a set of protrusions as described below provided on the attachment member 104 of the optical connector plug 101, in a state where the adapter 114 is inserted therein. In addition, like the first embodiment, the optical connector plug 101 is connected to the receptacle 110 in a so-called bayonet lock manner.

Figure 11A:
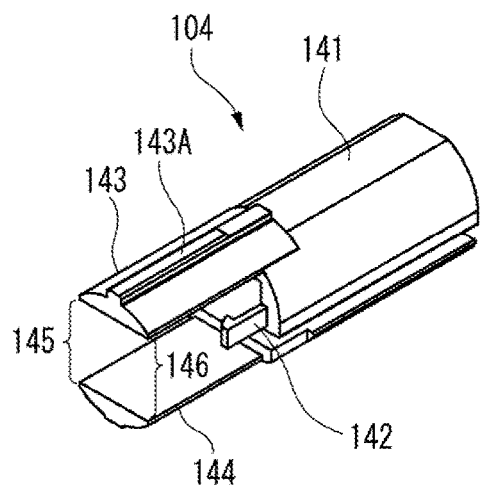
FIG. 11A is a front perspective view of an attachment member shown in FIG. 10
Figure 11B:
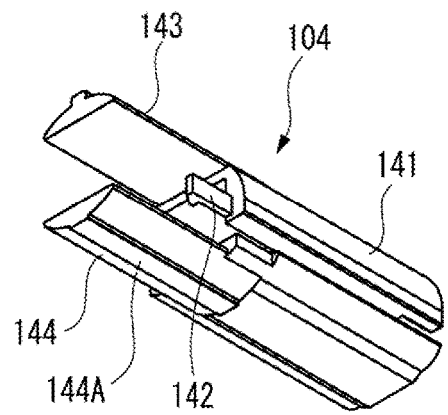
FIG. 11B is a bottom perspective view of the attachment member.

FIG. 11A is a front perspective view of the attachment member 104 and FIG. 11B is a rear perspective view of the attachment member 104.

The attachment member 104 is a member for attaching and fixing the optical connector 102 to the outer housing 103a. The attachment member 104 is a member capable of being inserted into the outer housing 103a. As shown in FIGS. 11A and 11B, the attachment member 104 is a member made of resin and has a receiving portion 141 and a set of protrusions 143, 144. The receiving portion 141 has a generally cylindrical shape, and is configured to receive a rear end side of the optical connecter 102 therein. The receiving portion 141 is provided with a pair of engaging claws 142 arranged to protrude from the receiving portion 141 toward the front of the optical connector plug 101. The pair of engaging claws 142 are arranged to oppose each other around the optical connector 102 fixed to the attachment member 104 and are configured to fix the optical connector 102 to the attachment member 104 by sandwiching the optical connector 102 from opposing sides thereof.

The set of protrusions 143, 144 are integrally formed with the receiving portion 141 and arranged to protrude forward from the receiving portion 141. On an upper surface portion of the upper protrusion 143 of the set of protrusions 143, 144, a convex portion 143A is provided along a longitudinal middle portion thereof. The convex portion 143A is formed to have a shape matched with that of the upper opening 112A provided in the cylindrical portion 112 of the receptacle 110.

The lower protrusion 144 is provided to oppose and be generally parallel to the upper protrusion 143. On a lower surface portion of the lower protrusion 144, a convex portion 144A is provided along a longitudinal middle portion thereof. The convex portion 144A is formed to have a shape matched with that of the lower opening 112B provided in the cylindrical portion 112 of the receptacle 110.

Space portions for receiving a front end portion of the optical connector 102, which protrudes from the receiving portion 141, are provided between the upper protrusion 143 and the lower protrusion 144. Herein, a space portion between one side surface of the upper protrusion 143 and one side surface of the lower protrusion 144 is referred to as a cutout portion 145, and a space portion between the other side surface of the upper protrusion 143 and the other side surface of the lower protrusion 144 is referred to as a cutout portion 146. A set of cutout portions 145, 146 are respectively provided at locations opposing each other around the optical connector 102 when the optical connector 102 has been fixed to the attachment member 104. That is, in the attached state of the optical connector 102, the optical connector 102, the cutout portion 145 and the cutout portion 146 are arranged on a straight line in a common plane in a direction perpendicular to the longitudinal direction of the optical connector 102.

In addition, like the first embodiment, the attachment member 104 according to the second embodiment can be configured to have a structure corresponding to the shape of the optical connector 102. Meanwhile, the optical connector 102 of the present example is, for example, a SC type optical connector, but a LC type optical connector or MPO type optical connector may be employed. The in-cylinder shape of the attachment member 104 and/or the shape of the pair of engaging claws 143 may be appropriately changed to correspond to the shape of the optical connector 102, while maintaining the external shape of the attachment member 104 to allow the attachment member 104 to be properly received in the outer housing 103a.

Figure 12:
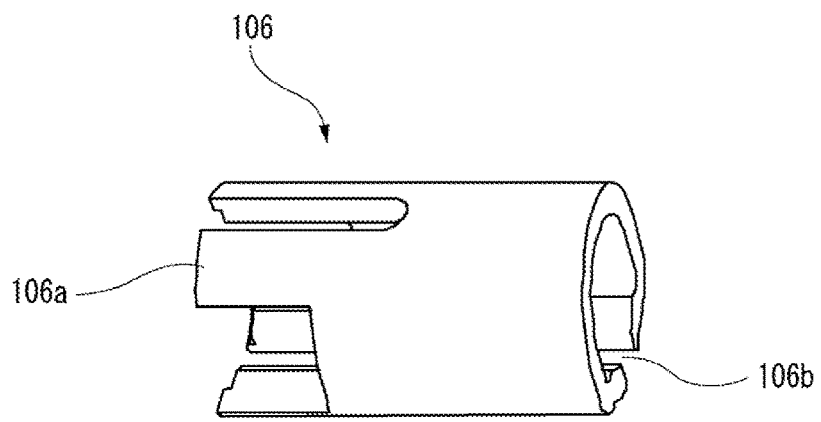
FIG. 12 is a perspective view of a pressing member shown in FIG. 10.

FIG. 12 is a perspective view of the pressing member 106.

The pressing member 106 is a member configured to be received in the outer housing 103a together with the attachment member 104 and includes an abutting portion 106a configured to be abutted against the attachment member 104 inside the outer housing 103a. The pressing member 106 is configured to position and fix the attachment member 104 inside the outer housing 103a as the abutting portion 106a is abutted against a rear end of the attachment portion 104. The pressing member 106 has a slit 106b cut out therefrom along a longitudinal direction thereof. An optical fiber drawn out of the optical fiber cord C can be received in the pressing member 106 though the slit 106b.

Figure 13:
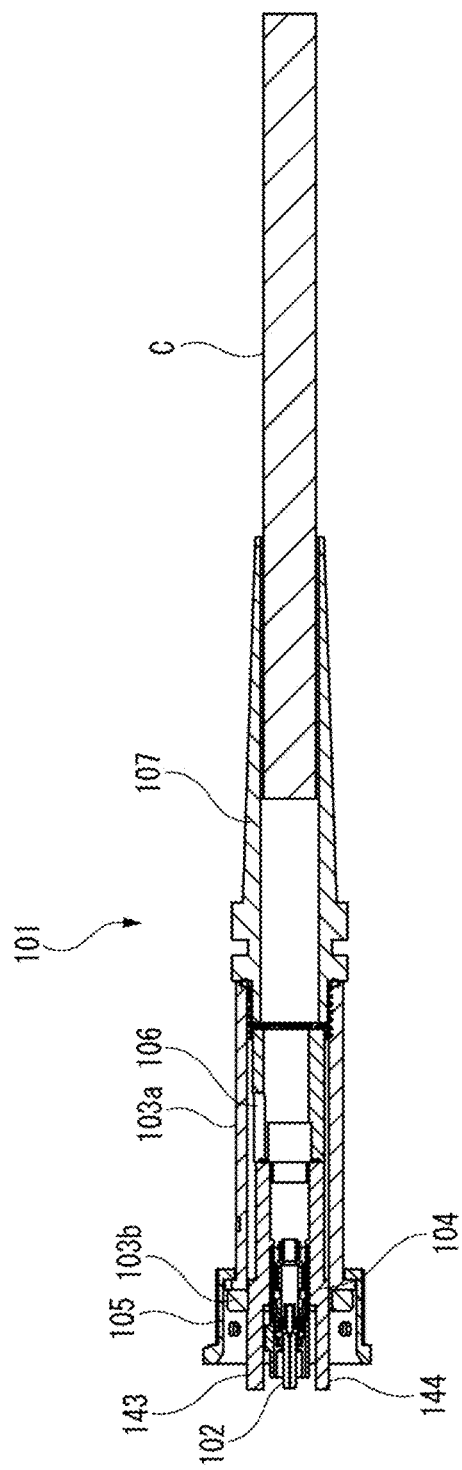
FIG. 13 is a sectional view showing an assembled state of the optical connector plug according to the second embodiment.

FIG. 13 is a sectional view showing a state where the optical connector plug 101 is assembled.

When the optical connector plug 101 is assembled, the optical fiber (not shown) drawn out of the optical fiber cord C is first introduced into the optical connector 102. Subsequently, the optical connector 102 is fixed to the attachment member 104, and then the attachment member 104 with the optical connector 102 fixed thereto is inserted into the outer housing 103a from the rear of the outer housing 103a. The watertight member 103b is sandwiched between the outer housing 103a and the cylindrical portion 112 protruding from the receptacle 110. At this time, a front end of the attachment member 104 is abutted against a projection (not shown) formed on a front end in a cylinder of the outer housing 103a, thereby inhibiting the attachment member 104 (and also the optical connector 102) from being further moved forward. That is, as shown in FIG. 13, the attachment member 104 (and also the optical connector 102) is fixed to the outer housing 103a in a state where the set of protrusions 143, 144 and the front surface portion of the optical connector 102 protrude from the outer housing 103a. Subsequently, the optical fiber connected with the optical connector 102 is received in the pressing member 106 through the slit 106b. Then, the pressing member 106 is inserted into the outer housing 103a from the rear thereof, so that the abutting portion 106a of the pressing member 106 is abutted against the rear end of the attachment member 104. Finally, the boot 107 is connected to the rear end of the outer housing 103a. In this way, the optical connector plug 101 is assembled.

As shown in FIGS. 9 and 13, in the state where the optical connector 102 is fixed in the outer housing 103a via the attachment member 104, the front end surface of the optical connector 102 and front end surfaces of the protrusions 143, 144 of the attachment member 104 protrude forward relative to the front end surface of the outer housing 103a. Also, the front end surfaces of the protrusions 143, 144 of the attachment member 104 protrude slightly forward relative to the front end surface 2A of the optical connector 2.

Further, the set of cutout portions 145, 146 provided between the upper protrusion 143 and the lower protrusion 144 of the attachment member 104 are respectively arranged at locations opposing each other around the optical connector 102 received in the outer housing 103a. That is, in the state where the optical connector 102 is fixed to the outer housing 103a via the attachment member 104, opposing side portions of the outer circumferential surface of the optical connector 102 are not covered with the outer housing 103a and the attachment member 104.

According to the configuration of the second embodiment described above, like the first embodiment, the front end of the optical connector 102 can be simply protected by the set of protrusions 143, 144. Also, it is possible to easily observe states of the front end surface and side surfaces of the optical connector 102 through the set of cutout portions 145, 146 and also to easily perform an operation of cleaning the front end surface of the optical connector 102 through the set of cutout portions 145, 146.

Further, in the optical connector plug 101 according to the second embodiment, the cover member 103 includes the outer hosing 103a and the attachment member 104 for fixing the optical connector 102 to the outer housing 103a, and the attachment member 104 integrally has the set of protrusions 143, 144. The attachment member 104 having the receiving portion 141 and the set of protrusions 143, 144 is larger than the attachment member 4 of the first embodiment, thereby facilitating assembly thereof when being inserted into and fixed to the outer housing 103a. Thus, it is possible to enhance work efficiency upon assembly of the optical connector plug 101.

Third Embodiment

Figure 14:
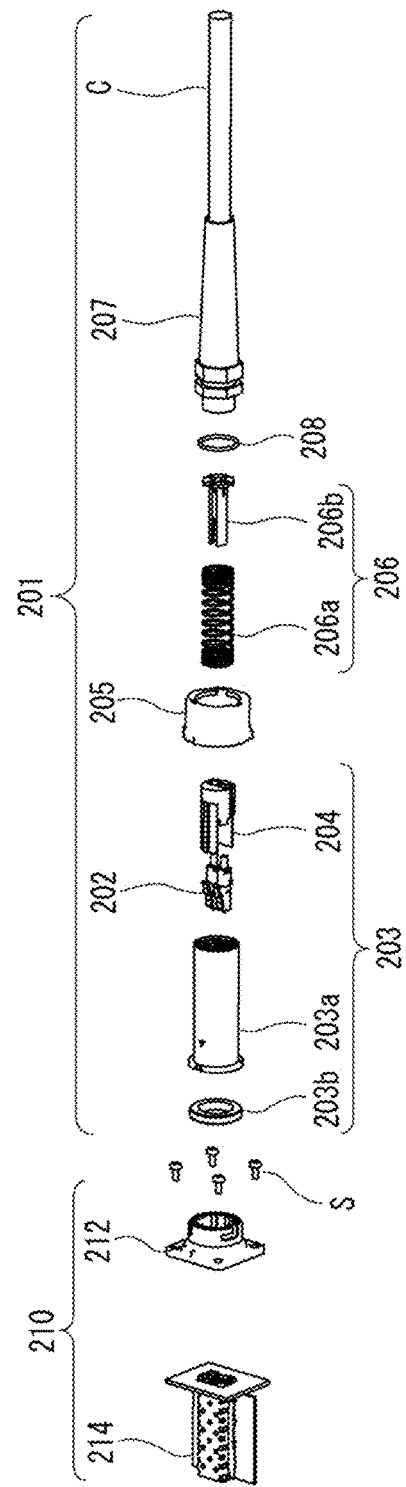
FIG. 14 is an exploded view of an optical connector plug and an optical connector receptacle according to a third embodiment.
Figure 15:
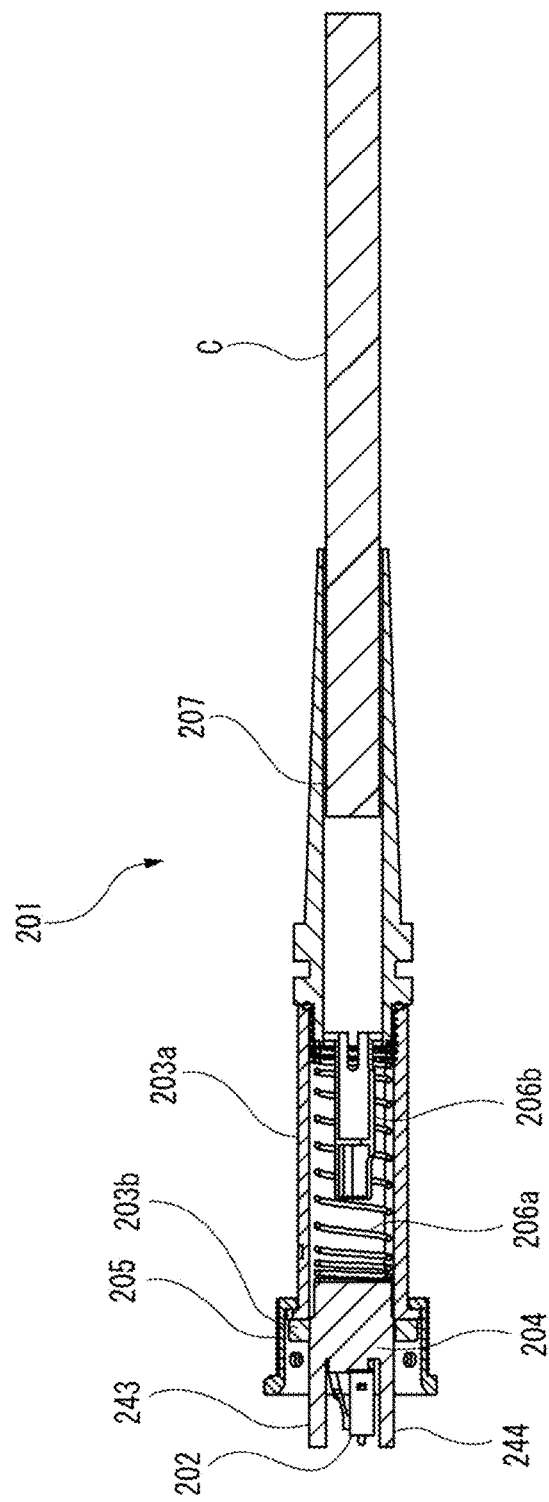
FIG. 15 is a sectional view showing an assembled state of the optical connector plug according to the third embodiment.

FIG. 14 is an exploded view of an optical connector plug and an optical connector receptacle according to the third embodiment. FIG. 15 is a sectional view showing an assembled state of the optical connector plug according to the third embodiment. Meanwhile, the detailed description of members common to the first embodiment and/or the second embodiment will be omitted.

The optical connector plug 201 according to the third embodiment includes an optical connector 202 and a cover member 203 receiving the optical connector 202 therein. The cover member 203 includes an outer housing 203a and an attachment member 204. The optical connector plug 201 additionally includes a coupling member 205, a pressing member 206 and a boot 207.

The optical connector 202 according to the third embodiment is a so-called LC type optical connector. The outer housing 203a and a watertight member 203b of the cover member 203 are members having the same shapes as those of the outer housing 103a and the watertight member 103b of the second embodiment. The attachment member 204 includes a receiving portion 241 and a set of protrusions 243, 244. The receiving portion 241 has a structure corresponding to a shape of the optical connector 202 and thus employs a shape different from that of the receiving portion 141 of the attachment member 104 of the second embodiment. Also, like the second embodiment, the set of protrusions 243, 244 has a shape suitable to be inserted into a cylindrical portion 212 of the receptacle 210.

The pressing member 206 includes an elastic member 206a and a guide member 206b. In this example, the elastic member 206a is, for example, a coil spring. The guide member 206b is configured to guide an optical fiber (not shown), which is drawn out of an optical fiber cord C, inside the outer housing 203a. The optical fiber guided by the guide member 206b is introduced into the optical connector 202 from a rear end side of the optical connector 202. In the assembled state of the optical connector plug 201 as shown in the sectional view of FIG. 15, the elastic member 206a is received in the outer housing 203a and arranged between a rear end of the attachment member 204 and a front end of the boot 207. Also, the guide member 206b is received in the outer housing 203a while the elastic member 206a is arranged on an outer circumference thereof, and a rear end thereof is fixed near to the front end of the boot 207. As such, in the optical connector plug 201 according to the third embodiment, the attachment member 204 is urged by the elastic member 206a and thus can be moved along a longitudinal direction of the outer housing 203a while being inserted in the outer housing 203a.

However, there is a case where the receptacle 210, which is a connection destination of the set of protrusions 243, 244 provided on the attachment member 204, has a different shape depending on a type of an adapter 214, or a dimensional error in a front and rear direction is likely to be occurred in opening portions thereof configured to allow the set of protrusions 243, 244 to be received therein.

By contrast, in the optical connector plug 201 according to the third embodiment, since the attachment member 204 can be moved along the longitudinal direction of the outer housing 203a while being inserted in the outer housing 203a, it is possible to absorb a shape difference or dimensional error of the receptacle 201. Therefore, a proper connection between the optical connector plug 201 and the receptacle 210 can be achieved.

Fourth Embodiment

Figure 16:
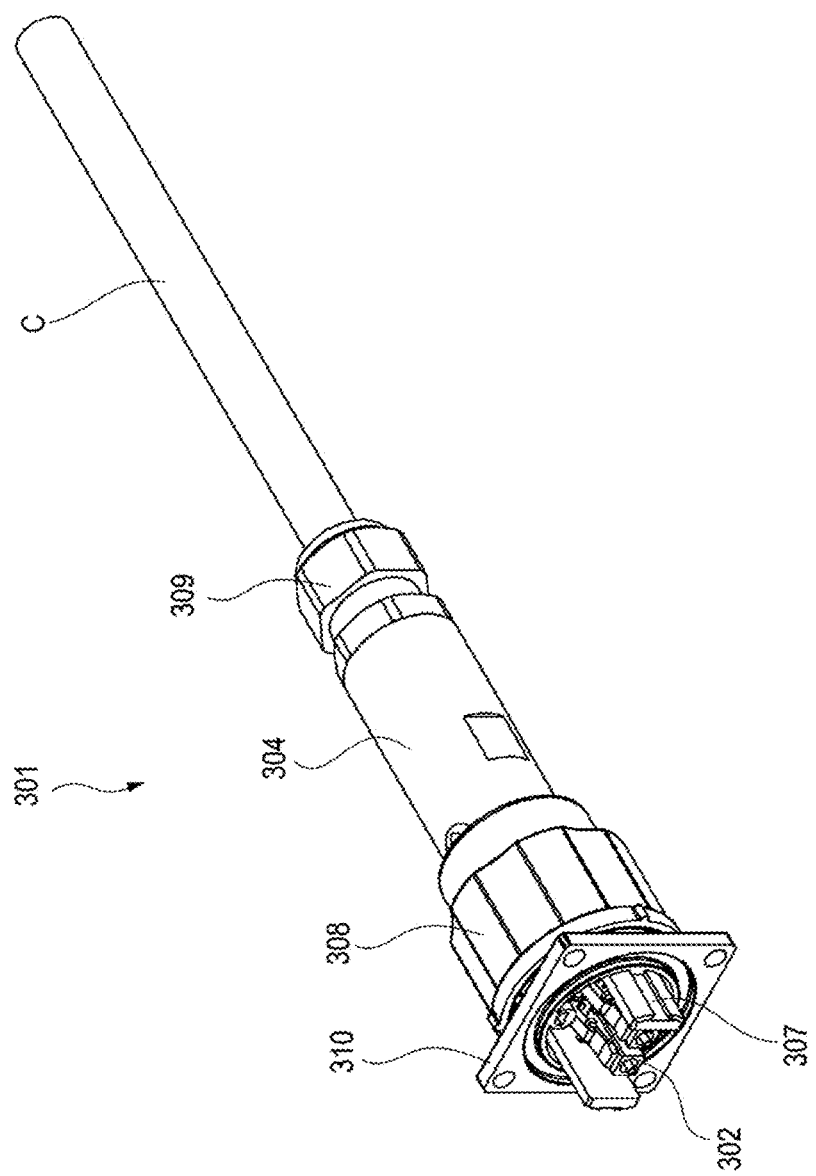
FIG. 16 is a perspective view showing an optical connector plug and an optical connector receptacle configured to allow the optical connector plug to be fitted therein according to a fourth embodiment.

FIG. 16 is a perspective view showing a state where an optical connector plug and an optical connector receptacle according to the fourth embodiment are fitted with each other. FIG. 17 is an exploded view of the optical connector plug and the optical connector receptacle shown in FIG. 16. FIG. 17 shows a state where the optical connector plug and the optical connector receptacle shown in FIG. 16 are rotated by 90° in a circumferential direction thereof. Hereinafter, a side of the optical connector plug, which faces the optical connector receptacle (left side in FIG. 17) is referred to as a front side of the optical connector plug and a side opposite thereto (right side in FIG. 17) is referred to as a rear side of the optical connector plug. Meanwhile, the detailed description of members common to the first embodiment will be omitted.

As shown in FIGS. 16 and 17, the optical connector plug 301 is configured to be freely detachably attached to the optical connector receptacle 310 (hereinafter, simply referred to as a receptacle).

The optical connector plug 301 includes optical connectors 302, a cover member 303 receiving the optical connectors 302 therein, a coupling member 308, and a cable gland 309. The cable gland 309 is connected to a rear end of an outer housing 304 and covers an optical fiber cord C as shown in FIG. 16. In addition, O-rings 320 are arranged between respective members, thereby ensuring a waterproofing property when the optical connector plug 301 has been assembled and also when the optical connector plug 301 has been attached to the receptacle 310.

The cover member 303 includes the outer housing 304 and an attachment member 305. The attachment member 305 includes a connector holder 306 for directly holding the optical connector 302 and a protective member 307 receiving the connector holder 306 therein.

Figure 18A:
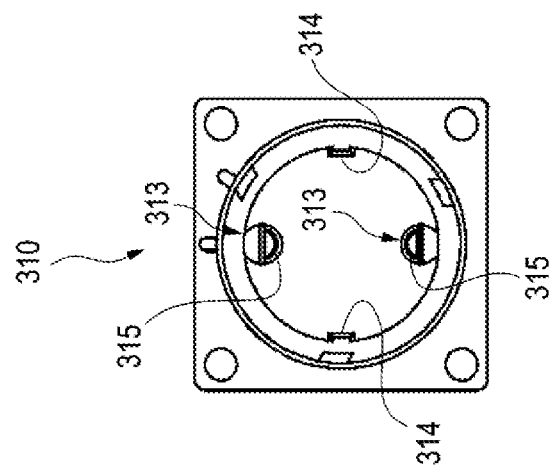
FIG. 18A is a perspective view of the optical connector receptacle shown in FIG. 16.
Figure 18B:
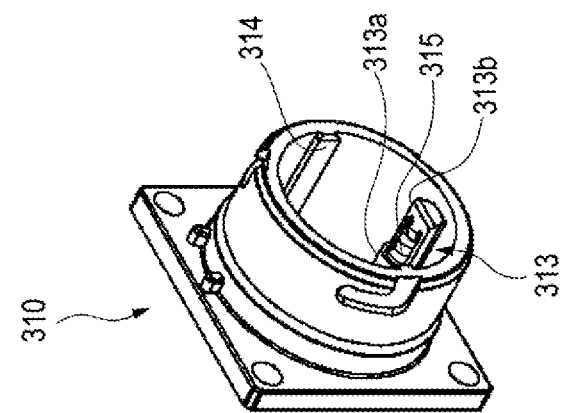
FIG. 18B is a perspective view of a state where an elastic member is attached to an inner surface of the optical connector receptacle.
Figure 18C:
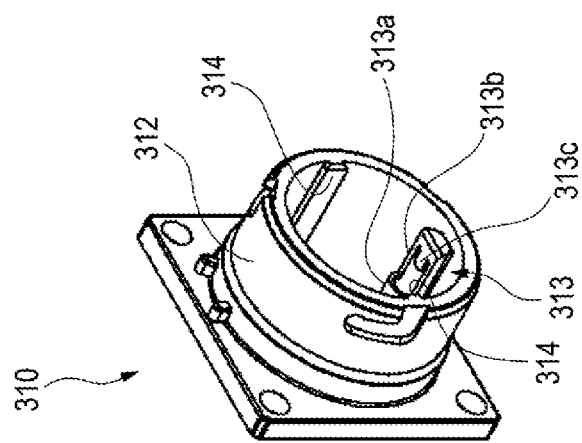
FIG. 18C is a rear view of the state where the elastic member is attached to the inner surface of the optical connector receptacle.

FIG. 18A is a perspective view of the receptacle 310, FIG. 18B is a perspective view of a state where a spring (elastic member) as described below is attached to an inner surface of the receptacle 310, and FIG. 18C is a rear view of the state where the spring is attached to the inner surface of the receptacle 310.

The receptacle 310 is used while being fixed, for example, to a wall surface (not shown). The receptacle 310 has a cylindrical portion 312 (an example of the receiving portion) protruding toward the optical connector plug 301. Like the first embodiment, the optical connector plug 301 is connected to the receptacle 310 in a so-called bayonet lock manner. As shown in FIG. 16, upon fitting between the optical connector plug 301 and the receptacle 310, the outer housing 304 of the optical connector plug 301 is received in the cylindrical portion 312, and also the optical connector 302 and a set of protrusions (described below) of the protective member 307 received in the outer housing 304 protrude forward from a front surface of the cylindrical portion 312. In addition, although not shown in the present embodiment, an adapter (see FIGS. 9 and 10) capable of being connected to the optical connector 302 can be inserted in the cylindrical portion 312.

On the inner surface of the cylindrical portion 312, a set of spring receiving portions 313 for attaching a spring 315 and a set of convex portions 314 capable of being engaged with the set of protrusions of the protective member 307 as described below are provided. As shown in FIG. 18C, the set of spring receiving portions 313 are respectively provided at locations vertically opposing each other on the inner surface of the cylindrical portion 312. The set of convex portions 314 are respectively provided at locations on an imaginary line perpendicular to an imaginary line connecting the set of spring receiving portions 313, i.e., locations laterally opposing each other on the inner surface of the cylindrical portion 312.

Each spring receiving portion 313 has a cylindrical portion 313*a* covering the entire circumference of the spring 315 on a front side thereof and also has a semi-circular cross-sectioned portion 313*b* covering a part of the spring 315 on a rear side thereof. The semi-circular portion 313*b* is provided with a projection 313*c* protruding from a rear surface side of the cylindrical portion 312 toward a front surface side thereof.

As shown in FIG. 18B, the springs 315 are respectively receiving in the set of spring receiving portions 313. Each spring 315 is received in the spring receiving portion 313 by inserting one end thereof into the cylindrical portion 313*a* from the semi-circular portion 313*b* of the spring receiving portion 313 and then fitting the other end onto the projection 313*c* provided in the semi-circular portion 313*b*. As such, the spring 315 is received in the spring receiving portion 313 so that a part thereof is exposed to the inner surface of the receptacle 310 from the semi-circular portion 313*b*.

Figure 19B:
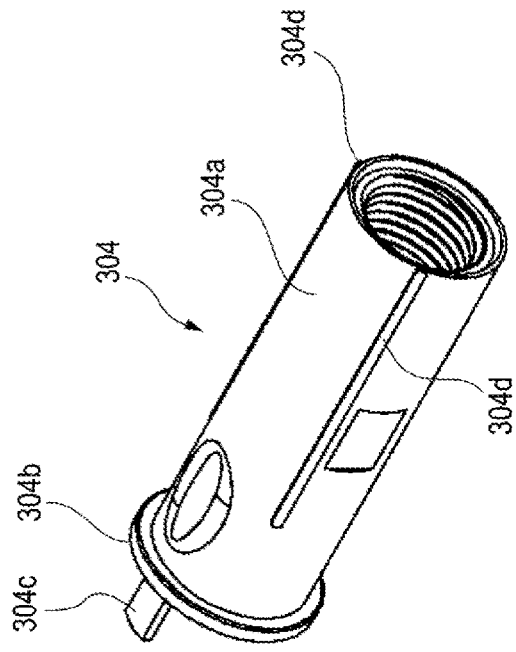
FIG. 19B is a rear perspective view of the outer housing.
Figure 19A:
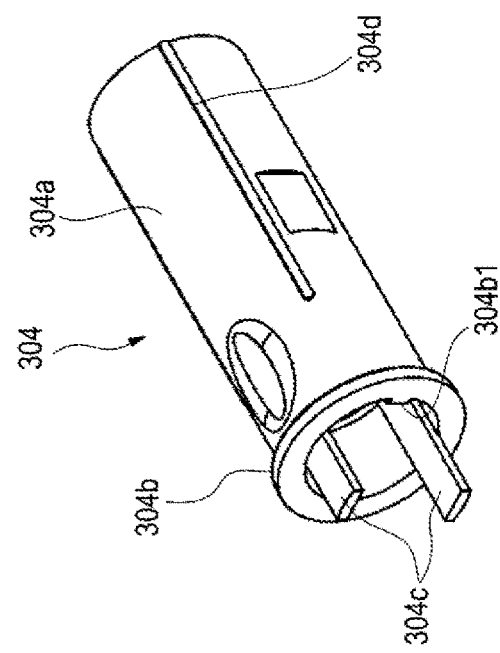
FIG. 19A is a front perspective view of an outer housing shown in FIG. 16.
Figure 19C:
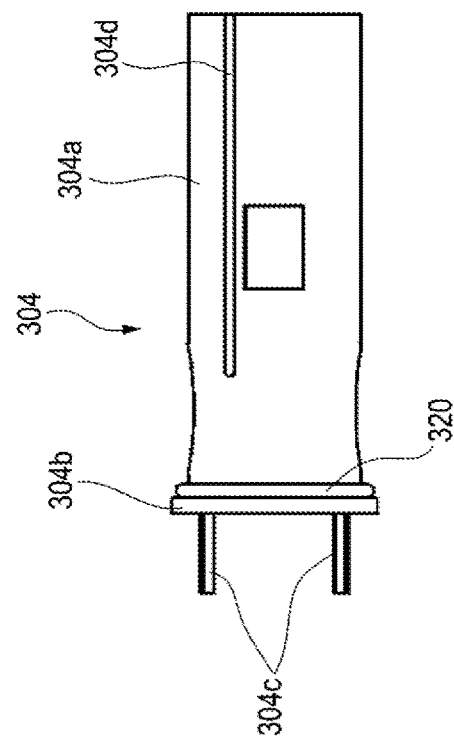
FIG. 19C is a side view of a state where an O-ring is attached to the outer housing.

FIG. 19A is a front perspective view of the outer housing 304, FIG. 19B is a rear perspective view of the outer housing 304, and FIG. 19C is a side view of a state where an O-ring 320 is attached to the outer housing 304.

The outer housing 304 is a generally cylindrical member, and the optical connector 302 together with the attachment member 305 is received therein. The outer housing 304 includes a cylindrical body portion 304*a*, a flange 304*b* provided on a front end surface of the body portion 304*a*, and a set of projections 304*c* protruding forward (toward the receptacle 310) from the flange 304*b*. The flange 304*b* is a portion having a diameter larger than the body portion 304*a*. A set of claw portions 304*b*1 are provided on an inner circumferential surface of the flange 304*b*. The set of projections 304*c* are members configured to be abutted against the springs 315 received in the spring receiving portions 313 of the receptacle 310 and are provided at locations corresponding to the spring receiving portions 313. Meanwhile, the set of claw portions 304*b*1 and the set of projections 304*c* are arranged such that an imaginary line connecting the set of claw portions 304*b*1 and an imaginary line connecting the set of projections 304*c* are generally perpendicular to each other. Also, long convex portions 304*d* along a longitudinal direction are provided at two locations on an outer circumferential surface of the body portion 304*a*. The long convex portions 304*d* extend forward from the rear end of the body portion 304*a* (but do not extend up to the front end of the body portion 304*a*). In addition, as shown in FIG. 19C, the O-ring 320 is mounted at the rear of the flange 304*b* of the outer housing 304.

Figure 20A:
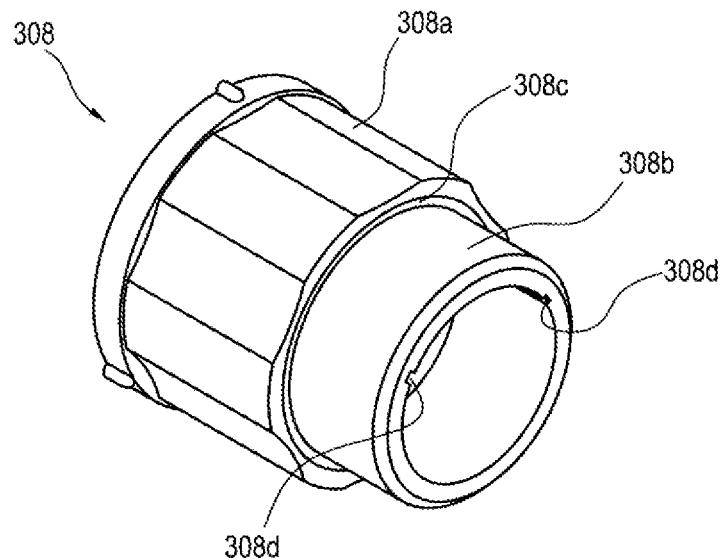
FIG. 20A is a perspective view of an engagement member shown in FIG. 16
Figure 20B:
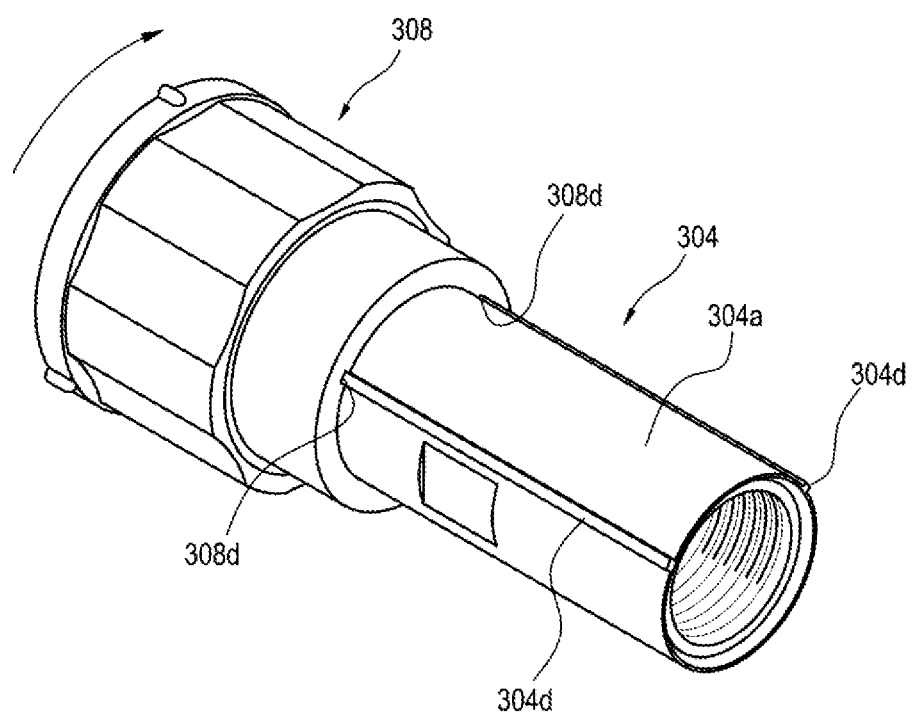
FIG. 20B is a perspective view showing a state where the engagement member is mounted on the outer housing.

FIG. 20A is a perspective view of the coupling member 308 and FIG. 20B is a perspective view showing a state where the coupling member 308 is mounted on the outer housing 304.

The coupling member 308 is a member for coupling (fitting) the optical connector plug 301 with the receptacle 310 and is provided to be slidable around the outer housing 304. As shown in FIG. 20A, the coupling member 308 includes a large diameter portion 308*a* on a front side thereof and a small diameter portion 308*b* on a rear side thereof, and a step portion 308*c* is formed between the large diameter portion 308*a* and the small diameter portion 308*b*. On an inner surface of the coupling member 308, convex portions 308*d* are provided at locations corresponding to two long convex portions 304*d* provided on the outer circumferential surface of the outer housing 304.

As shown in FIG. 20B, the outer housing 304 is inserted into the coupling member 308 from the front thereof, and as the long convex portions 304*d* of the outer housing 304 are fitted into the convex portions 308*d* of the coupling member 308, the coupling member 308 can be slid around the outer housing 304 in a front and rear direction. The outer housing 304 inserted in the coupling member 308 from the front thereof is inhibited from being further moved rearward relative to the coupling member 308, as the flange 304*b* is abutted against the step portion 308*c* of the coupling member 308 via the O-ring 320. At this time, since the long convex portions 304*d* of the outer housing 304 are not provided on the front side of the body portion 304*a*, the convex portions 308*d* of the coupling member 308 are separated from the long convex portions 304*d*. Accordingly, it is possible to rotate the coupling member 308 in a circumferential direction thereof while the flange 304b of the outer housing 304 and the step portion 308c of the coupling member 308 are abutted against each other. If the coupling member 308 is slightly rotated in the circumferential direction, positions of the long convex portion 304b and the concave portions 308b are displaced in the circumferential direction, thereby inhibiting the outer housing 304 from moving forward relative to the coupling member 308. In this way, the outer housing 304 and the coupling member 308 are assembled in a locked state.

Figure 21A:
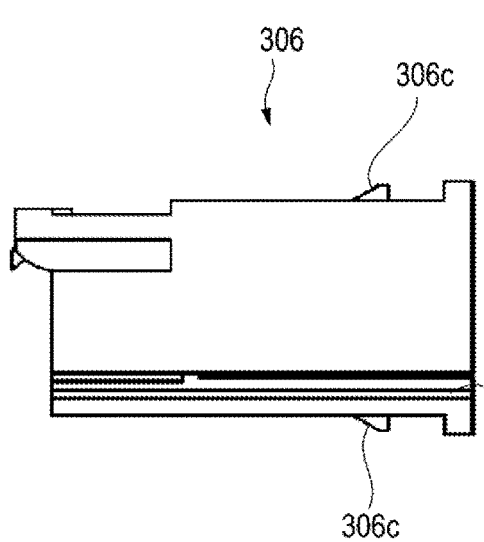
FIG. 21A is a side view of a connector holder shown in FIG. 17
Figure 21B:
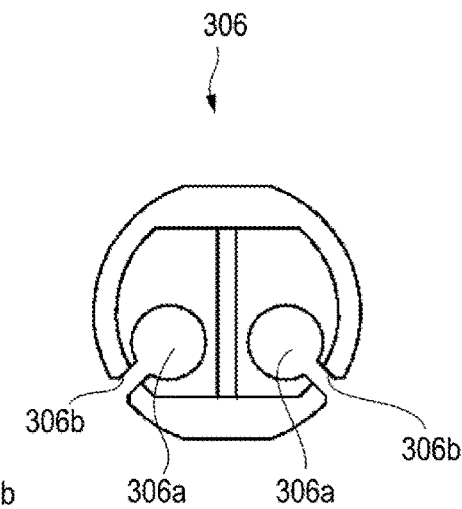
FIG. 21B is a rear view of the connector holder.

FIG. 21A is a side view of the connector holder 306 and FIG. 21B is a rear view of the connector holder 306.

The connector holder 306 is a member of attaching and fixing the optical connector 302 to the outer housing 304 via the protective member 307 as described below. The connector holder 306 is a member capable of being inserted into the outer housing 304 from the rear thereof. As shown in FIG. 21B, the connector holder 306 has a set of opening portions 306a capable of receiving optical connectors 302 (herein, a set of LC connectors) therein. Also, a slit 306b in communication with the outside is provided obliquely below each opening portion 306a. When the optical connectors 302 are received in the connector holder 306, optical fibers (not shown) connected to the optical connectors 302 are first inserted into the opening portions 306a through the slits 306b, and then the optical fibers are pulled rearward. By doing so, the optical connectors 302 can be received in the opening portions 306a. Meanwhile, as shown in FIG. 21A, a set of upper and lower claw portions 306c are provided to protrude from an outer circumferential surface of the connector holder 306.

Figure 22A:
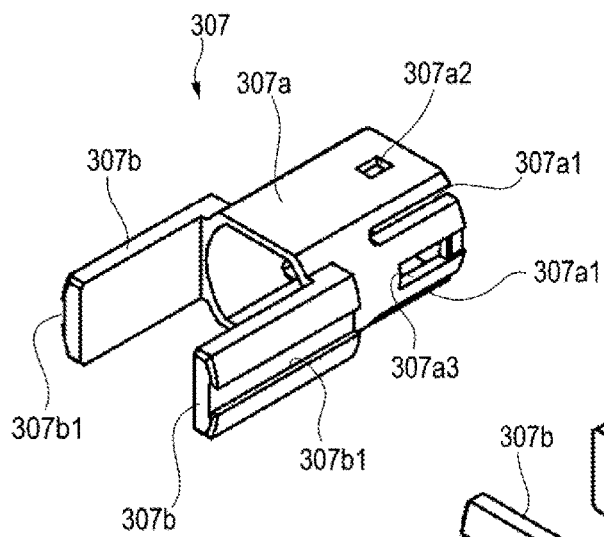
FIG. 22A is a front perspective view of a protective member shown in FIG. 17
Figure 22B:
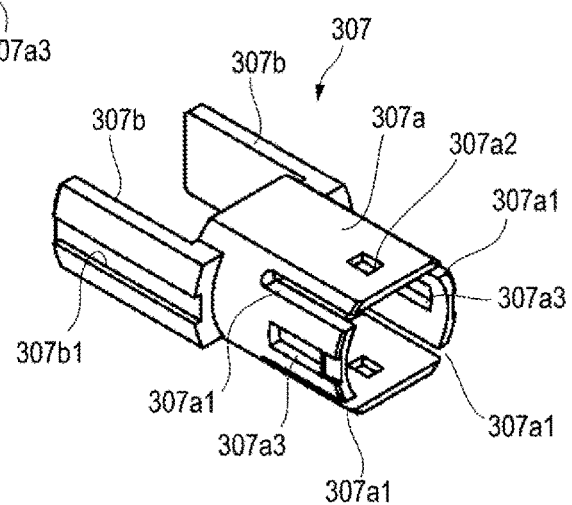
FIG. 22B is a rear perspective view of the protective member.
Figure 23:
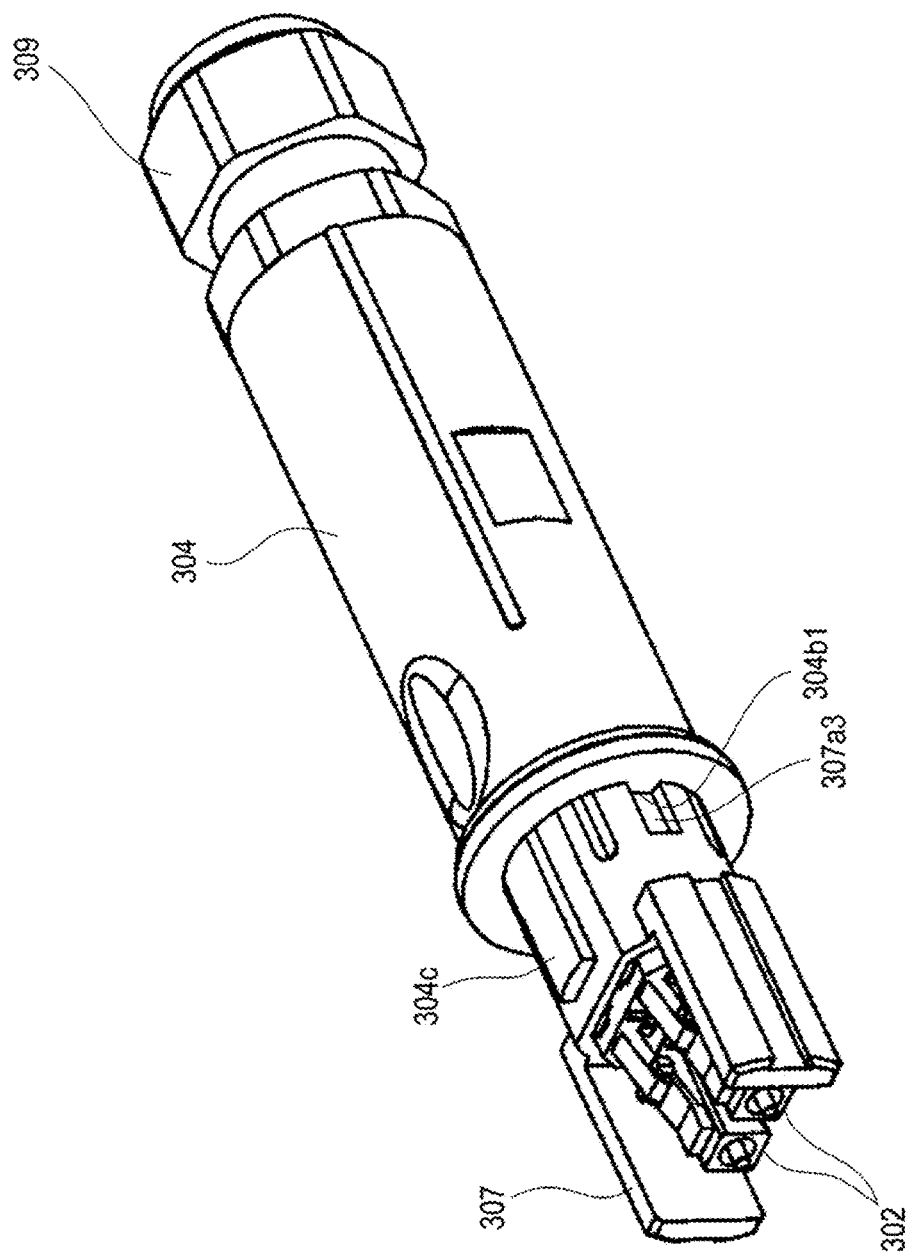
FIG. 23 is a perspective view showing a state where an attachment member with optical connectors attached thereto is assembled with the outer housing.

FIG. 22A is a front perspective view of the protective member 307 and FIG. 22B is a rear perspective view of the protective member 307. Also, FIG. 23 is a perspective view of a state where the attachment member 305 (connector holder 306 and protective member 307) with the optical connectors 302 attached thereto is assembled with the outer housing 304.

The protective member 307 is a member for attaching and fixing the connector holder 306, in which the optical connectors 302 are received, to the outer housing 304 and also for protecting front end surfaces of the optical connectors 302. The protective member 307 is a member capable of being inserted into the outer housing 304 from the front thereof. The protective member 307 has a receiving portion 307a and a set of protrusions 307b. The receiving portion 307a has a shape corresponding to an external shape of the connector holder 306, and the connector holder 306 (and thus the optical connectors 302) is received therein. The receiving portion 307a is provided with slits 307a1 at four corners in a circumferential direction thereof. When the connector holder 306 is received, the slits 307 are slightly expanded outward, thereby facilitating insertion of the connector holder 306 into the receiving portion 307a. In upper and lower surfaces of the receiving portion 307a, first opening portions 307a2 are respectively provided to be engaged with the set of claw portions 306c of the connector holder 306. Also, in right and left surfaces of the receiving portion 307a, second opening portions 307a3 are respectively provided to be engaged with the set of claw portions 304b1 of the outer housing 304. The second opening portions 307a3 have a predetermined length along a longitudinal direction of the optical connector plug 301. Accordingly, as shown in FIG. 23, when the protective member 307 is received in the outer housing 304, the protective member 307 can be moved relative to the outer housing 304 in the front and rear direction in a state where each of the claw portion 304b1 is engaged with the respective second opening portions 307a3.

The set of protrusions 307b are integrally formed with the receiving portion 307a and arranged to protrude forward from the receiving portion 307a. On outer surfaces of the set of protrusions 307b, groove portions 307b1 are respectively provided along longitudinal middle portions thereof. The groove portions 307b1 are formed to correspond to a shape of the set of convex portions 314 provided on the inner surface of the cylindrical portion 312 of the receptacle 310.

Space portions for receiving front end portions of the optical connectors 302, which protrude from the receiving portion 307a, are provided between the set of protrusions 307b. Relations between the set of protrusions 307b and cutout portions, which are provided between the set of protrusion 307b, are similar to those of the first to third embodiments.

Figure 24:
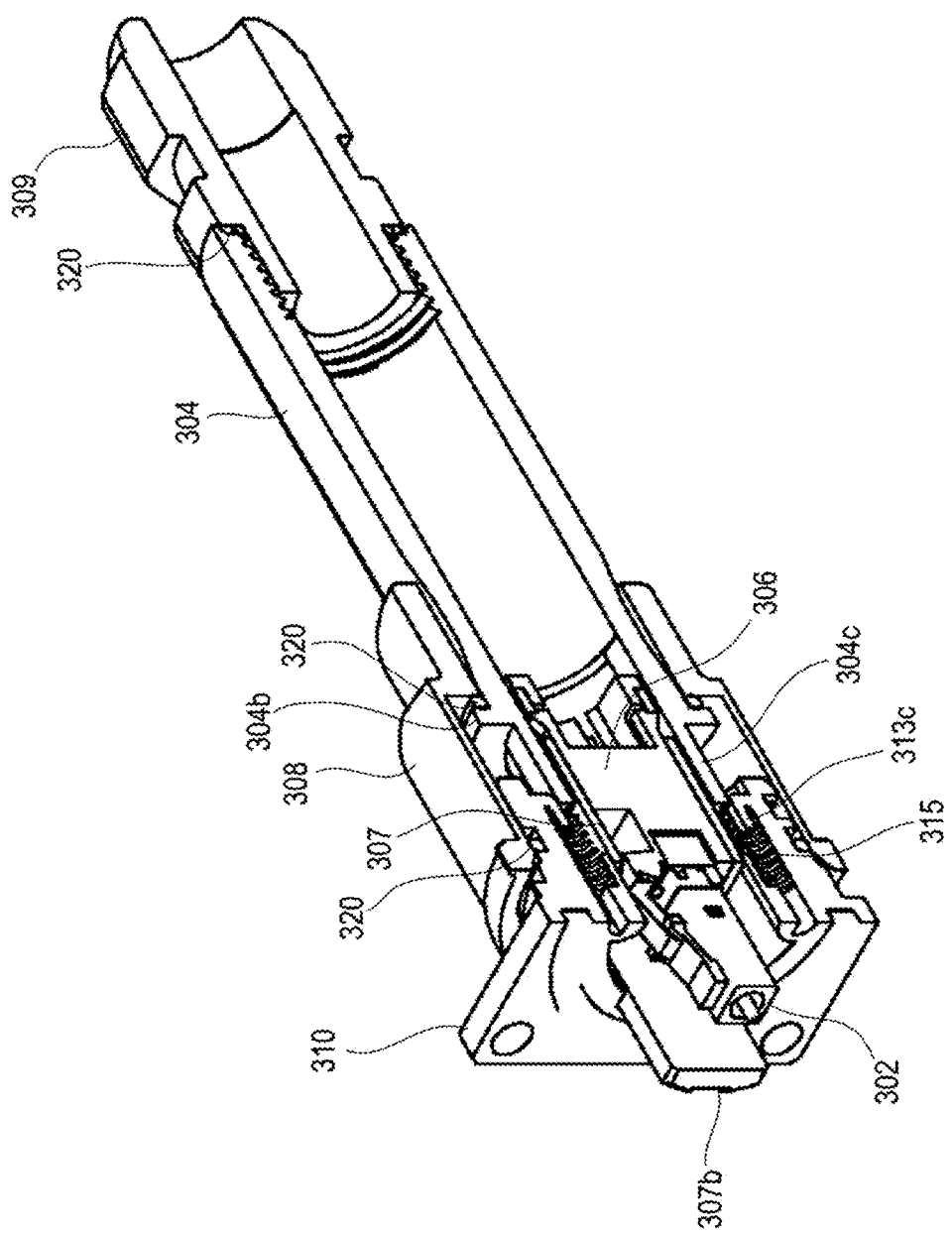
FIG. 24 is a sectional perspective view showing a state where the optical connector plug according to the fourth embodiment is assembled and then fitted in the optical connector receptacle.

FIG. 24 is a sectional perspective view showing a state where the optical connector plug 301 is assembled and then the optical connector plug 301 is fitted in the receptacle 310.

When the optical connector plug 301 according to the present embodiment is assembled, an optical fiber cord C (see FIG. 16) is first inserted through the coupling member 308 and the cable gland 309. Subsequently, optical fibers (not shown) drawn out of the optical fiber cord C are introduced into the optical connectors 302. Subsequently, the optical fibers connected to the optical connectors 302 are inserted through the slits 306b of the connector holder 306 and then are pulled rearward, so that the optical connectors 302 are received in the opening portions 306a of the connector holder 306. Subsequently, the protective member 307 is inserted into the outer housing 304 from the front of the outer housing 304. At this time, the claw portions 304b1 formed on the inner surface of the flange 304b of the outer housing 304 are engaged with the second opening portions 307a3 of the protective member 307. Thus, the protective member 307 is attached to the outer housing 304 while movement thereof in the front and rear direction by the length of the second opening portions 307a3 is ensured.

Then, the connector holder 306 with the optical connectors 302 fixed thereto is inserted into the outer housing 304 from the rear of the outer housing 304, and also the connector holder 306 is inserted into the protective member 307 received in the outer housing 304. At this time, the first opening portions 307a1 formed in the receiving portion 307a of the protective member 307 are engaged with the claw portions 306c of the connector holder 306, thereby fixing the connector holder 306 to the protective member 307. In this way, as shown in FIGS. 23 and 24, the optical connector 302, the connector holder 306 and the protective member 307 are received in the outer housing 304 in a state where the front surface portions of the optical connectors 302 and the set of protrusions 307b of the protective member 307 protrude from the outer housing 304.

Subsequently, the coupling member 308 with the optical fiber cord C inserted therethrough is moved forward and then is fitted around the outer housing 304. At this time, in a state where the long convex portions 304d of the outer housing 304 are fitted in the concave portions 308d of the coupling member 308, the outer housing 304 passes through the coupling member 308 and thus the flange 304b is abutted against the step portion 308c of the coupling member 308 via the O-ring 320. In this state, the coupling member 308 is rotated in the circumferential direction, thereby inhibiting movement of the outer housing 304 in the front and rear direction relative to the coupling member 308. Thus, the outer housing 304 and the coupling member 308 are mounted in a locked state. Finally, the cable gland 309, which has been put on the optical fiber cord C, is connected to the rear end of the outer housing 304. In this way, the optical connector plug 301 is assembled. Meanwhile, O-rings 320 are respectively arranged between the receptacle 310 and a front end surface of the flange 304b of the outer housing 304, between a rear end surface of the flange 304b and the step portion 308c of the coupling member 308, and between a rear end surface of the body portion 304a of the outer housing 304 and the cable gland 309, thereby ensuring a waterproofing property in a connection structure between the optical connector plug 301 and the receptacle 310.

When the optical connector plug 301 assembled as described above is connected to the receptacle 310, the front end of the optical connector plug 301 is inserted into the cylindrical portion 312 of the receptacle 310 in a state where the set of protrusions 307b of the protective member 307 are engaged with the set of convex portions 314 of the receptacle 310. At this time, the optical connectors 302 are connected to an adapter (not shown) in the receptacle 310, and also as shown in FIG. 24, the set of projections 304c of the outer housing 304 are abutted against the springs 315 partially exposed from the inner surface of the receptacle 310. In the state where the set of projections 304c are abutted against the springs 315, the coupling member 308 of the optical connector plug 301 is further pushed toward the receptacle 310 and then is rotated. Thus, the optical connector plug 301 and the receptacle 310 are connected to each other in the bayonet lock manner as described above.

As such, upon fitting between the optical connector plug 301 and the receptacle 310, i.e., when the optical connectors 302 are connected to the adapter received in the receptacle 310, the set of projections 304c of the outer housing 304 are abutted against the springs 315 on the inner surface of the receptacle 310 and thus the outer housing 304 is urged rearward (in a direction opposite to the receptacle 310) along the longitudinal direction of the optical connector plug 301. Also, at this time, as shown in FIG. 23, the protective member 307 can be moved along the longitudinal direction of the outer housing 304 by the length of the second opening portions 307a3 while being inserted in the outer housing 304.

However, there is a case where the receptacle 310, which is an engagement destination of the set of protrusions 307b provided on the protective member 307, has a shape different depending on a type of the adapter, or a dimensional error in a front and rear direction is likely to be occurred in opening portions thereof configured to allow the set of protrusions 307b to be received therein. Accordingly, a pressing force when an optical connector is connected to an adapter is likely to be continuously exerted, which may result in poor connection or breakage between the optical connector and the adapter.

By contrast, in the optical connector plug 301 according to the fourth embodiment, when being fitted into the receptacle 310, the attachment member 305 (protective member 307) can be moved along the longitudinal direction of the outer housing 304 while being inserted in the outer housing 304, and also the outer housing 304 is urged rearward along the longitudinal direction of the optical connector plug 301. Accordingly, a pressing force exerted when the optical connectors 302 are connected to the adapter can be released. Therefore, it is possible to absorb a shape difference or dimensional error of the receptacle 310, thereby achieving a proper connection between the optical connector plug 301 and the receptacle 310.

Further, in the present embodiment, the projections 304c protruding toward the receptacle 310 are provided on the front surface portion of the outer housing 304 and the springs 315 are provided on the inner surface of the receptacle 310, thereby causing the outer housing 304 to be urged rearward as the projections 304c are abutted against the springs 315. Therefore, it is possible to easily release a pressing force exerted on the optical connectors 302 upon fitting.

Further, the projections 304c of the outer housing 304 are arranged at locations corresponding to the set of cutout portions defined between the set of the protrusions 307b of the protective member 307. In this way, the projections 304c are provided at locations, where they do not interfere with the set of protrusions 307b. Therefore, it is possible to cause a proper fitting of the optical connector plug 301 into the receptacle 310 and a rearward urging of the outer housing 304 to be compatible.

Further, the outer housing 304 and the protective member 307 include concave and convex structures to be engaged with each other. Specifically, since the claw portions 304b1 formed on the flange 304b of the outer housing 304 are engaged with the second opening portions 307a3 of the protective member 307, the protective member 307 is allowed to be moved in the front and rear direction by the length of the second opening portions 307a3 in a state where the protective member 307 is attached to the outer housing 304.

Further, the groove portions 307b1 are formed on the outer surfaces of the set of protrusions 307b of the protective member 307 along the longitudinal direction of the outer housing 304, and the groove portions 307b1 can be engaged with the convex portions 314 formed on the inner surface of the receptacle 310. According to this configuration, it is possible to engage the set of protrusions 307b1 with the receptacle 301 at proper locations.

Further, the springs 315 received in the spring receiving portions 313 provided on the inner surface of the receptacle 310 are partially exposed from the inner surface of the receptacle 310. According to this configuration, it is possible to facilitate attachment of the springs 315 to the receptacle 310.

Meanwhile, although in the fourth embodiment as described above, the projections 304c protruding toward the receptacle 310 are provided on the outer housing 304 and the springs 315 are provided on the inner surface of the receptacle 310, the present invention is not limited to such an example. For example, projections protruding toward the optical connector plug may be provided on the receptacle, and elastic members to be abutted against the projections may be attached to the outer housing.

Further, although in the fourth embodiment as described above, the outer housing 304 and the protective member 307 includes concave and convex structures to be engaged with each other, the present invention is not limited to such an example. For example, in a case where a cross-sectional shape of an outer surface of the protective member (and a cross-sectional shape of an inner surface of the outer housing corresponding thereto) has a non-axisymmetric shape (for example, a quadrangular shape), movement of the protective member in the front and rear direction can be guided by the outer housing even if the concave and convex structures are not provided.

Fifth Embodiment

Figure 25:
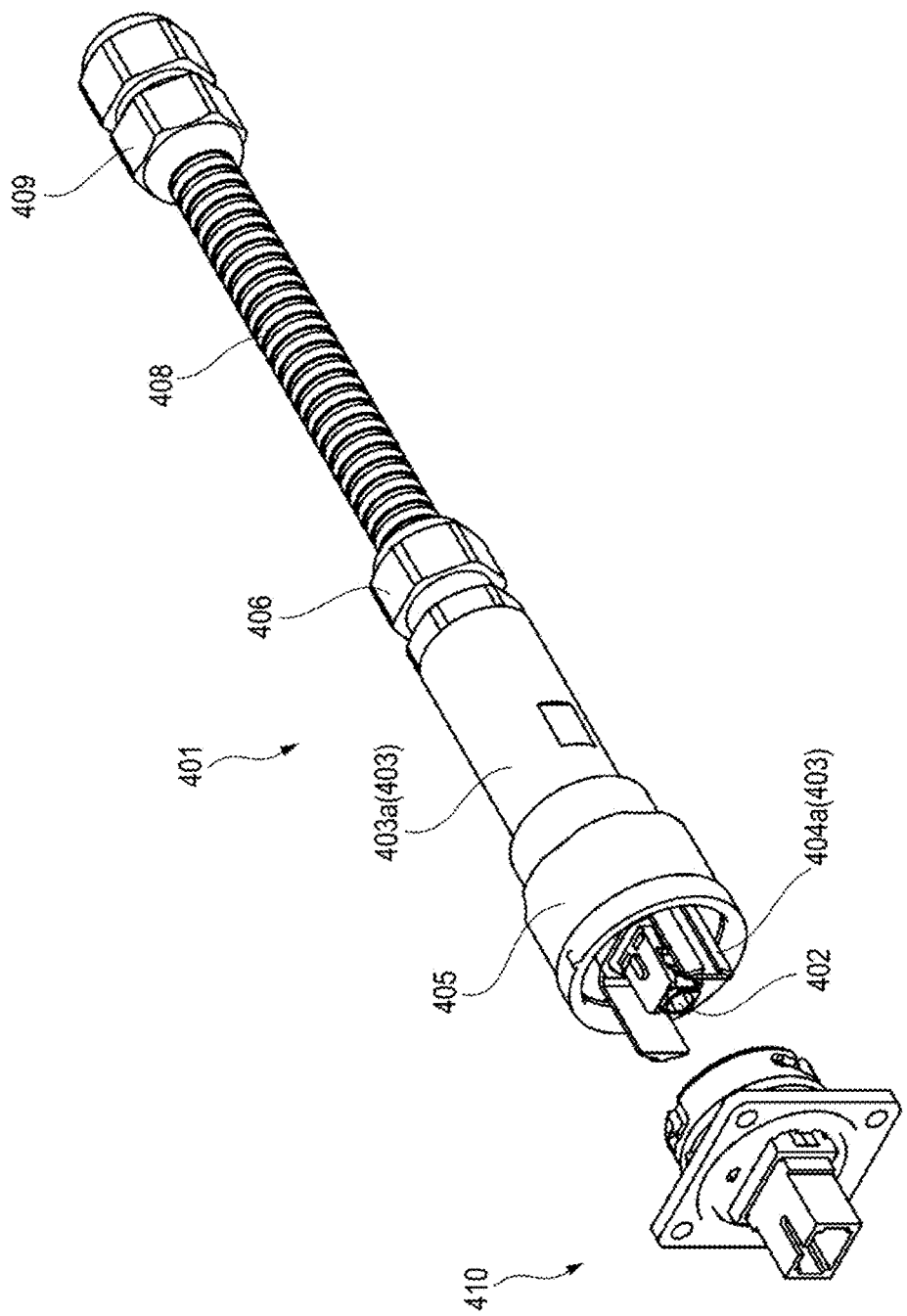
FIG. 25 is a perspective view showing an optical connector plug and an optical connector receptacle configured to allow the optical connector plug to be fitted therein according to a fifth embodiment.
Figure 26:
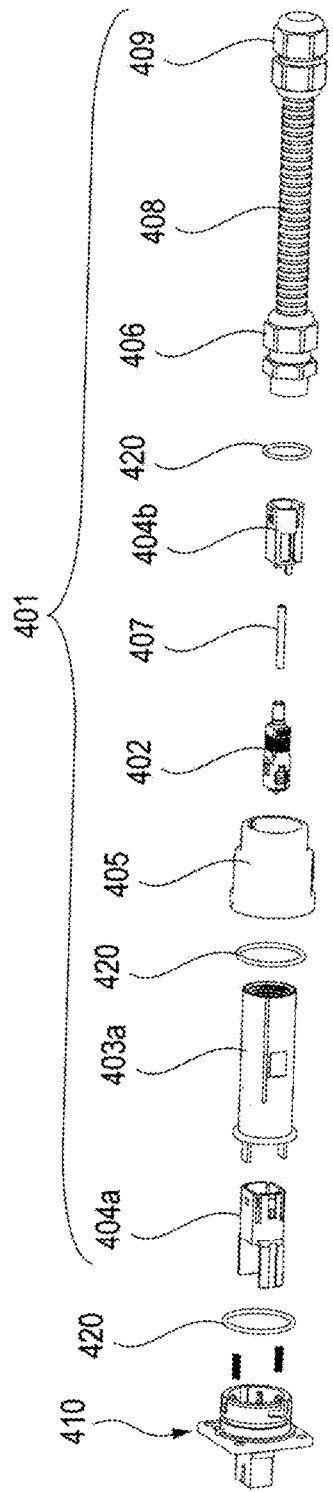
FIG. 26 is an exploded view of the optical connector plug and the optical connector receptacle shown in FIG. 25.

FIG. 25 is a perspective view showing an optical connector plug according to the fifth embodiment and FIG. 26 is an exploded view of the optical connector plug as shown in FIG. 25 and an optical connector receptacle configured to allow the optical connector plug to be fitted therein. Hereinafter, a side of the optical connector plug, which faces the optical connector receptacle (left side in FIG. 26) is referred to as a front side of the optical connector plug and a side opposite thereto (right side in FIG. 26) is referred to as a rear side of the optical connector plug. Meanwhile, the detailed description of members common to the first to fourth embodiments will be omitted.

As shown in FIGS. 25 and 26, the optical connector plug 401 is configured to be freely detachably attached to the optical connector receptacle 410 (hereinafter, simply referred to as a receptacle). The optical connector plug 401 includes an optical connector 402, a cover member 403 receiving the optical connector 402 therein, a coupling member 405, and a first cable gland 406. The cover member 403 includes an outer housing 403a, an attachment member 404a received in the outer housing 403a and a connector holder 404b. The first cable gland 406 is connected to a rear end of the outer housing 403a. O-rings 420 are arranged between respective members, thereby ensuring a waterproofing property when the optical connector plug 401 has been assembled and also when the optical connector plug 401 has been attached to the receptacle 410.

In the present embodiment, the optical connector plug 401 additionally includes a protective tube 407, a protective pipe 408 and a second cable gland 409. The protective tube 407 is a member made of, for example, resin and is intended to protect a fusion connection portion between a short glass fiber held by the optical connector 402 and an optical fiber exposed from an optical fiber cord C (see FIG. 27), which is inserted from the rear of the optical connector plug 401. For example, when an fusing and connecting operation of optical fibers is performed in situ, an operator fuses and connects the short glass fiber, which is previously inserted and held in a ferrule of the optical connector 402, to a glass fiber portion exposed from another transmission cable (for example, optical fiber cord C). Subsequently, the operator covers such a fusion connection portion with the protective tube 408 and then causes the optical connector 402 and the optical fiber cord C connected to the optical connector 402 to be received in the outer housing 403a. In this way, the fusion connection portion of the glass fibers is protected by the protective tube 408. Thus, even if the fusing and connecting operation is required in a site where the optical connector plug 401 is fitted into the receptacle 410, protection of the fusion connection portion can be properly achieved.

The protective pipe 408 is connected to a rear end of the first cable gland 406 and as shown in FIGS. 27A and 27B, the optical fiber cord C is received therein. The protective pipe 408 is made of hard plastic or metal and preferably has a bellows-shaped structure. If the protective pipe 408 is too soft, a function thereof as a protective pipe cannot be performed, but if the protective pipe 408 is too hard, a large strain is likely to be applied to the optical connector plug 401, so that it is necessary to increase the entire length of the optical connector plug 401. By contrast, in the present embodiment, the protective pipe 408 is made of hard plastic or metal and additionally has a bellows-shaped structure. Accordingly, when the optical fiber cord C led out of a rear end of the second cable gland 409 is bent, the protective pipe 408 can have pliability (flexibility) enough to be bent to follow the optical fiber cord C.

As shown in FIG. 27B, the second cable gland 409 is connected to a rear end of the protective pipe 408 via a sealing member 410 (e.g., resin packing) at a front half thereof. Also, the second cable gland 409 fixes the optical fiber cord C via a sealing member 410 at the rear half thereof. As such, since via the sealing members 410, the second cable gland 409 is connected to the protective pipe 408 and fixes the optical fiber cord C, a waterproofing property is maintained. Meanwhile, the first cable gland 406 or the second cable gland 409 (nut components constituting them) is preferably made of hard plastic or metal, like the protective pipe 408, but is not necessary to be made of the same material as that of the protective pipe 408.

As described above, the optical connector plug 401 of the fifth embodiment additionally includes the flexible protective pipe 408, and the protective pipe 408 is coupled to a rear end of the cover member 403 at one end thereof and is connected with the second cable gland 409 at the other end. As such, since the flexible protective pipe 408 is provided, an optical fiber connected to the optical connector 402 in the optical connector plug 401 can be properly protected, and also even if the optical fiber cord C led out of the rear end of the second cable gland 409 is bent, the protective pipe 408 can be bent to follow bending of the cord, thereby reducing a strain to be applied to the optical connector 402.

Sixth Embodiment

FIG. 28 is a perspective view of an optical connector plug according to the sixth embodiment. Meanwhile, the detailed description of members common to the first to fifth embodiments will be omitted.

As shown in FIG. 28, the optical connector plug 501 includes a cover member 503 and a coupling member 505 therethrough which the cover member 503 is inserted. An optical connector (not shown) similar to those of the first embodiment and the like is received in the cover member 503. The coupling member 505 is configured to be rotatable and slidable around the cover member 503 and also to be coupled with an optical connector receptacle (not shown) in a bayonet lock manner. An engagement member 507 capable of being engaged with the coupling member 503 is provided on an outer circumferential surface of the cover member 503. Hereinafter, a side of the optical connector plug 501, which faces the receptacle is referred to as a front side of the optical connector plug 501 and a side opposite thereto is referred to as a rear side of the optical connector plug 501.

As shown in FIG. 29A, a protrusion 506 protruding rearward is provided on a rear end of the coupling member 505 according to the present embodiment, and an opening portion 506A is formed in the protrusion 506. As shown in FIG. 29B, the engagement member 507 provided on the outer circumference of the cover member 503 includes an annular portion 508 following an outer circumferential shape of the cover member 503 and a protrusion 509 protruding forward from the annular portion 508. The engagement member 507 can be attached to the cover member 503 by the annular portion 508. An engaging convex portion 509A capable of being engaged with an opening portion 505A of the coupling member 505 is formed on a distal end of the protrusion 509. Also, a pressing convex portion 509B for pressing the protrusion 509 is formed on a middle portion of the protrusion 509.

Figure 30A:
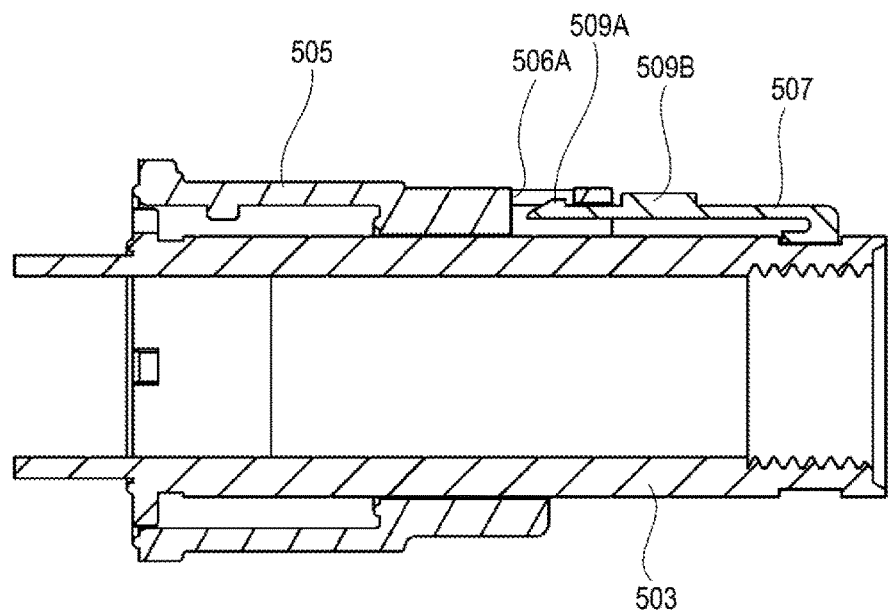
FIG. 30A is a sectional view taken along a line B-B of the optical connector plug shown in FIG. 28

As shown in FIG. 30A, in the present embodiment, the engaging convex portion 509A of the engagement portion 507 attached around the cover member 503 is engaged with the opening portion 506A of the coupling member 505, therethrough which the cover member 503 is inserted. Therefore, it is possible to lock rotating and sliding of the coupling member 505, which is provided to be rotatable and slidable relative to the cover member 503. Also, as shown in FIG. 30B, as the pressing convex portion 509B of the engagement member 507 is pressed, coupling between the opening portion 506A of the coupling member 505 and the engaging convex portion 509A of the engagement member 507 can be released.

However, when an optical connector plug as described in the first to fifth embodiment is engaged with a receptacle, it is necessary to connect an optical connector of the optical connector plug to an adapter of the receptacle fixed to a wall surface or the like and then to fit a coupling member into the receptacle in a bayonet lock manner. At this time, if an operator fits the optical connector plug into the receptacle while holding the coupling member, the coupling member is likely to be fitted into the receptacle in a state where the optical connector of the optical connector plug is not connected with the adapter of the receptacle.

By contrast, the optical connector plug 501 of the present embodiment includes the coupling member 505, which is capable of being coupled with the receptacle and therethrough which the cover member 503 is inserted, and the engagement member 509 configured to be engaged with the coupling member 505 so as to be easily detachably attached to the coupling member 505 is provided on the outer circumference of the cover member 503. According to this configuration, it is possible to lock rotating or sliding of the coupling member 505. Accordingly, in order to fit the optical connector plug 501 into the receptacle, the optical connector is first connected to the adapter and then locking of the coupling member 505 relative to the cover member 503 is released, thereby allowing the coupling member 505 to be fitted into the receptacle while rotating and sliding the coupling member 505. Therefore, it is possible to prevent the coupling member 505 from being erroneously fitted into the receptacle in a state where the optical connector is not properly connected to the adapter.

Figure 30B:
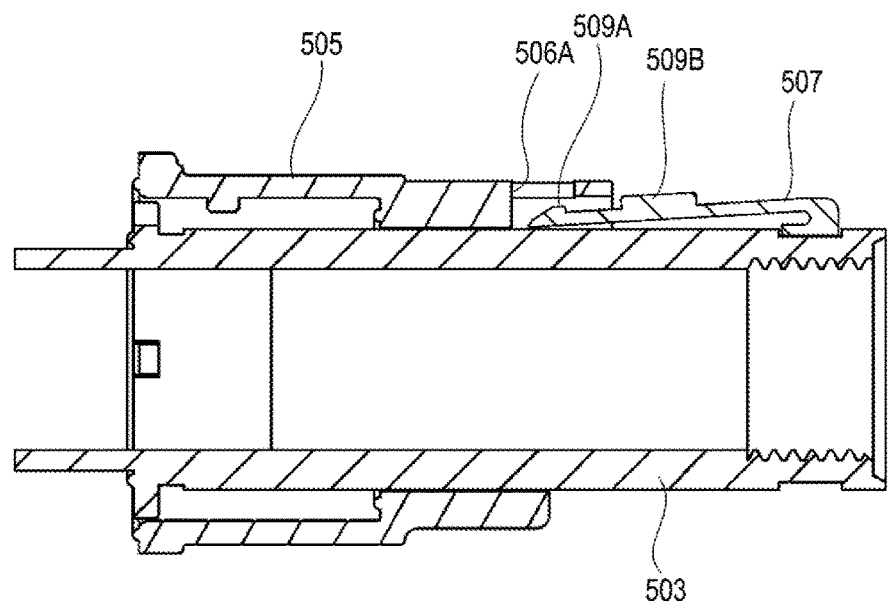
FIG. 30B is a sectional view similar to 30A in the case where the engagement member is not engaged with the coupling member.

As shown in FIGS. 30A and 30B, the engagement member 507 is a member configured to be detachably attached to the outer circumference of the cover member 503. Accordingly, only when it is necessary to lock the coupling member 505, the engagement member 507 may be attached to the cover member 503. Meanwhile, although in the present embodiment, the engagement member 507 is configured as a separate body from the cover member 503, the engagement member 507 may be integrally formed on the outer circumference of the cover member 503.

Although in the foregoing, the present invention has been described with referenced to the detailed and specific embodiments, it will be apparent to those skilled in the art that numerous changes and modifications thereof can be made without departing the scope and spirit of the present invention. Also, the numbers, positions, shapes and the like of components as described above are not limited to the foregoing embodiments and accordingly can be changed to any numbers, positions, shapes and the like suitable for implementing the present invention.

This application is based on Japanese Patent Application Serial No. 2015-032875 filed on Feb. 23, 2015, Japanese Patent Application Serial No. 2015-188115 filed on Sep. 25, 2015 and Japanese Patent Application Serial No. 2015-218264 filed on Nov. 6, 2015, the entire contents of which are incorporated herein by reference.

The invention claimed is:

1. An optical connector plug, comprising:
an optical connector having an optical fiber built therein; and
a cover member receiving the optical connector therein;
wherein the cover member comprises a set of protrusions provided to protrude forward relative to a front end surface of the optical connector;
wherein a set of cutout portions as space portions are provided between the set of protrusions;
wherein the set of cutout portions are arranged at locations opposing each other around the optical connector,
wherein the cover member comprises an outer housing and an attachment member which attaches the optical connector to the outer housing;
wherein the attachment member integrally has the set of protrusions and is configured to be insertable into the outer housing and to have a structure corresponding to a shape of the optical connector,
wherein in a state where the attachment member is inserted in the outer housing, the attachment member can be moved along a longitudinal direction of the outer housing,
wherein when the optical connector is coupled with an adapter received in an optical connector receptacle, the outer housing is urged along the longitudinal direction toward a direction opposite to the optical connector receptacle,
wherein a projection protruding toward the optical connector receptacle is provided on a front surface portion of the outer housing;
wherein when the optical connector is coupled with the adapter, the projection is abutted against an elastic member provided on an inner surface of the optical connector receptacle.

2. The optical connector plug according to claim 1, wherein the projection is arranged at a location corresponding to one or both of the set of cutout portions.

3. The optical connector plug according to claim 1, wherein the outer housing and the attachment member comprise concave and convex structures to be engaged with each other, wherein the attachment member can be moved along the longitudinal direction due to the concave and convex structures.

4. An optical connector plug, comprising:
an optical connector having an optical fiber built therein; and
a cover member receiving the optical connector therein;
wherein the cover member comprises a set of protrusions provided to protrude forward relative to a front end surface of the optical connector;
wherein a set of cutout portions as space portions are provided between the set of protrusions;
wherein the set of cutout portions are arranged at locations opposing each other around the optical connector,
the optical connector plug further comprising:
an attachment member which attaches the optical connector to the cover member and configured to be insertable into the cover member and also up to the vicinity of the middle portion of the cover member in a longitudinal direction thereof;
wherein the attachment member has a structure corresponding to a shape of the optical connector, wherein the attachment member is engaged with the protrusions and thus can be fixed to the cover member.

5. The optical connector plug according to claim 4, wherein the cover member integrally has the set of protrusions.

6. The optical connector plug according to claim 1, wherein groove portions are formed on outer surfaces of the set of protrusions along a longitudinal direction of the cover member, wherein the groove portions can be engaged with convex portions formed on an inner surface of an optical connector receptacle.

7. The optical connector plug according to claim 1, further comprising:
  a flexible protective pipe configured to be coupled to a rear end of the cover member at one end thereof and to have a cable gland at the other end thereof.

8. The optical connector plug according to claim 1, further comprising:
  a coupling member capable of being coupled with an optical connector receptacle, wherein the cover member is inserted through the coupling member;
  wherein an engagement portion configured to be engaged with the coupling member so as to be easily detachably attached to the coupling member is provided on an outer circumference of the cover member.

9. An optical connector receptacle, comprising an adapter and a receiving portion which receives the adapter therein, the adapter capable of being connected to the optical connector built in an optical connector plug comprising:
  an optical connector having an optical fiber built therein; and
  a cover member receiving the optical connector therein;
  wherein the cover member comprises a set of protrusions provided to protrude forward relative to a front end surface of the optical connector;
  wherein a set of cutout portions as space portions are provided between the set of protrusions;
  wherein the set of cutout portions are arranged at locations opposing each other around the optical connector;
  wherein an elastic member is provided on an inner surface of the receiving portion;
  wherein the elastic member is configured to urge the cover member toward a direction opposite to the adapter in a state where the optical connector is coupled with the adapter.

10. The optical connector receptacle according to claim 9, wherein the elastic member is partially exposed from the inner surface.

11. The optical connector receptacle according to claim 9, wherein convex portions capable of being engaged with the set of protrusions of the optical connector plug are provided on the inner surface of the receiving portion.

12. An optical connector connection structure, comprising an optical connector plug and an optical connector receptacle capable of being coupled with each other,
  wherein the optical connector plug comprises an optical connector having an optical fiber built therein, and a cover member receiving the optical connector therein, wherein the cover member comprises a set of protrusions provided to protrude forward relative to a front end surface of the optical connector, wherein a set of cutout portions as space portions are provided between the set of protrusions, and wherein the set of cutout portions are arranged at locations opposing each other around the optical connector, and
  wherein the optical connector receptacle comprises an adapter capable of being connected to the optical connector built in the optical connector plug, and a receiving portion which receives the adapter therein, wherein an elastic member is provided on an inner surface of the receiving portion, and wherein the elastic member is configured to urge the cover member toward a direction opposite to the adapter in a state where the optical connector is coupled with the adapter.

* * * * *